(12) United States Patent
Narasimhamurthy et al.

(10) Patent No.: US 9,733,968 B2
(45) Date of Patent: Aug. 15, 2017

(54) VIRTUAL MACHINE (VM) MIGRATION FROM SWITCHED FABRIC BASED COMPUTING SYSTEM TO EXTERNAL SYSTEMS

(71) Applicant: Oracle International Corporation, Redwood Shores, CA (US)

(72) Inventors: Giridhar Narasimhamurthy, Bangalore (IN); Kailasa Malehithlu Marathe, Bangalore (IN); Pramod Yellupur Venkatesh, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 101 days.

(21) Appl. No.: 14/658,315

(22) Filed: Mar. 16, 2015

(65) Prior Publication Data

US 2016/0274926 A1    Sep. 22, 2016

(51) Int. Cl.
| | |
|---|---|
| *G06F 3/00* | (2006.01) |
| *G06F 9/455* | (2006.01) |
| *G06F 9/54* | (2006.01) |
| *H04L 12/931* | (2013.01) |

(52) U.S. Cl.
CPC ............ *G06F 9/45558* (2013.01); *G06F 9/54* (2013.01); *G06F 2009/4557* (2013.01); *G06F 2009/45595* (2013.01); *H04L 49/70* (2013.01)

(58) Field of Classification Search
CPC .................................. G06F 9/54; G06F 4/5533
USPC ........................................................ 719/310
See application file for complete search history.

(56) References Cited

U.S. PATENT DOCUMENTS

| | | | | |
|---|---|---|---|---|
| 9,319,375 | B2* | 4/2016 | Gross, IV | H04L 61/103 |
| 2012/0173757 | A1* | 7/2012 | Sanden | G06F 9/45558 709/238 |
| 2012/0278807 | A1* | 11/2012 | Nakagawa | G06F 9/4856 718/1 |
| 2013/0250951 | A1* | 9/2013 | Koganti | H04L 49/356 370/390 |

OTHER PUBLICATIONS

George Valentino, Distributed Interactive simulation over fibre channel, 1996.*

(Continued)

*Primary Examiner* — Lechi Truong
(74) *Attorney, Agent, or Firm* — IPHorizons PLLC; Narendra Reddy Thappeta

(57) ABSTRACT

An aspect of the present disclosure provides for migration of a virtual machine (VM) on a switched-fabric based computing system to another (external) switched-fabric based computing system or non-switched-fabric based (external) computing system. Both of such external computing systems are communicatively coupled to the switched-fabric based computing system by Internet such that the data transfer after the migration is based on IP packets on the Internet. According to another aspect of the present disclosure, an appliance contains multiple nodes for hosting virtual machines. A switched fabric switches packets between the nodes based on point-to-point connections between each pair of ports, wherein each port is coupled directly to a corresponding node. A bridge supports migration of a first VM to a first external system coupled to the first appliance by Internet Protocol (IP) based network.

10 Claims, 13 Drawing Sheets

(56) References Cited

OTHER PUBLICATIONS

InfiniBand Architecture Overview Back to Basic, downloaded circa Dec. 23, 2014, pp. 1-38.
Gregory F. Pfister, An Introduction to the InfiniBand™ Architecture, High Performance Mass Storage and Parallel I/O: Technologies and Applications, chapter 42, pp. 617-632, date 2001, IEEE Press an Wiley Press.
Stephen Lawton, The Building Blocks of Converged & Hyper-Converged Infrastructure, tomsitpro.com/articles/convergedhyperconvergedinfrastructure,2804.html, date Sep. 30, 2014, pp. 1-5.
Oracle Virtual Networking, Overview and Frequently Asked Questions, date Mar. 26, 2013, pp. 1-6.
VXLAN Deep Dive—Define The Cloud, definethecloud.net/vxlandeepdive/, date Nov. 6, 2012, pp. 1-3.
M. Mahalingam, D. Dutt, K. Duda, P. Agarwal, L. Kreeger, T. Sridhar, M. Bursell, C. Wright, Virtual eXtensible Local Area Network (VXLAN): A Framework for Overlaying Virtualized Layer 2 Networks over Layer 3 Networks, RFC 7348, ISSN: 2070-1721, date Aug. 2014, pp. 1-22.

\* cited by examiner

FIG. 8A

| Mac Address of the migrated VM (810) | MID of the migrated VM locally (820) | IP Address of the migrated VM (830) | VNI of the migrated VM (840) |
|---|---|---|---|
|  |  |  |  |

| Mac Address of the migrated VM (810) | MID of the migrated VM locally (820) | IP Address of the migrated VM (830) | VNI of the migrated VM (840) |
|---|---|---|---|
| MAC2 | GID2 | IP2 | 100 |
| MAC7 | GID7A | IP7 | 200 |

| MID | Port |
|---|---|
| GID6 | IB Port 11 |
| GID40 | IB Port 20 |
| GID2A | IB Port 11 |

850 — table; 851 — MID; 852 — Port; 803 → GID6; 804 → GID40; 805 → GID2A

FIG. 8D

| VNI of the migrated VM | Mac Address of the migrated VM | IP Address of the remote bridge |
|---|---|---|
| 100 | MAC1 | IP-VTEP1 |

| Mac Address of the local VM | MID of the local VM | IP Address of the local VM | VNI of the local VM |
|---|---|---|---|
| MAC2 | GID2A | IP2 | 100 |

870; 871; 872; 873; 874; 807 → MAC2

VIRTUAL MACHINE (VM) MIGRATION FROM SWITCHED FABRIC BASED COMPUTING SYSTEM TO EXTERNAL SYSTEMS

BACKGROUND OF THE DISCLOSURE

Technical Field

The present disclosure relates to cloud computing, and more specifically to virtual machine (VM) migration from switched fabric based computing system to external systems.

Related Art

Computing systems are often implemented to contain nodes interconnected by switched fabrics. A node may contain computational and/or storage resources. A switched fabric relies on point-to-point connection between each pair of input and output ports, for providing the switching operation.

Thus, in a common configuration, each node is coupled to one of the ports of the fabric, and the fabric couples one port to another by a corresponding point-to-point connection, as required for transfer of packets between the corresponding nodes. The switched fabric may be implemented using structures such as cross-bars, banyan switches, etc Infini-Band (IB) technology based computing system is an example of such a computing system.

Virtual machines (VMs) may be provided within each of the computing nodes in an IB fabric. A VM is a self-contained operating environment that operates as if it were a separate machine, i.e., a separate computer. Virtual machines may be hosted in the computing nodes of an IB fabric based computing system to provide multiple instances of the same or different operating system(s) for execution of respective sets of applications.

It is often necessary to migrate VMs (e.g., for efficient allocation of computing resources) from one computing node to another. Migration refers to movement of a VM from a source computing node to a target computing node for reasons such as load balancing, etc., while providing continued computational/storage resources and data connectivity (post-migration) to/from applications already executing in the VM after the migration.

Migration typically entails hosting the target computer node with an image of the migrating VM, transporting various state-information of applications and other software components to the operational image, and ceasing the execution of the VM on the source computer node. Often such migration is within the same switched fabric based computing system in that both the source and target nodes are contained in the computing system.

However, it may be desirable to migrate VMs to external systems also for reasons such as scalability, ability to meet requirements during peak demand, cost-efficiencies, etc. Aspects of the present disclosure provide VM migration from switched fabric based computing system to external systems, as described below with examples.

BRIEF DESCRIPTION OF THE DRAWINGS

Example embodiments of the present disclosure will be described with reference to the accompanying drawings briefly described below.

FIG. 8A depicts the content of a bridge table prior to VM migration, in an embodiment of the present disclosure.

FIG. 8B depicts the content of a bridge table after VM migration, in an embodiment of the present disclosure.

FIG. 8C depicts the content of a forwarding table in an external system after VM migration, in an embodiment of the present disclosure.

FIG. 8D depicts the content of a VTEP table in an external system after VM migration, in an embodiment of the present disclosure.

FIG. 8E depicts the content of a bridge table in an external system after VM migration, in an embodiment of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for migration of a virtual machine (VM) on a switched-fabric based computing system to another (external) switched-fabric based computing system or non-switched-fabric based (external) computing system, as suitable in the corresponding duration. As a result, the types of external systems available for migrating VMs (from a switched fabric based computing systems) may be enhanced.

In an embodiment, in case of packets being transported to an external system, the packets initially are encapsulated by fabric headers facilitating internal switching based on the fabric headers. However, the fabric header is removed and encapsulated with another outer header suitable for sending to both of switched-fabric based computing systems and non-switched-fabric based computing systems.

According to another aspect, both of such external computing systems are communicatively coupled to the switched-fabric based computing system by Internet Protocol (IP) such that the data transfer after the migration is based on IP packets. As a result, the number of external systems available for migrating VMs may be enhanced.

Accordingly, in an embodiment, an appliance contains multiple nodes for hosting virtual machines. A switched fabric switches packets between the nodes based on point-to-point connections between each pair of ports, wherein each port is coupled directly to a corresponding node. A bridge supports migration of a first VM to a first external system coupled to the first appliance by Internet Protocol (IP) based network. Packets are transported between the bridge and the external system based on IP.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
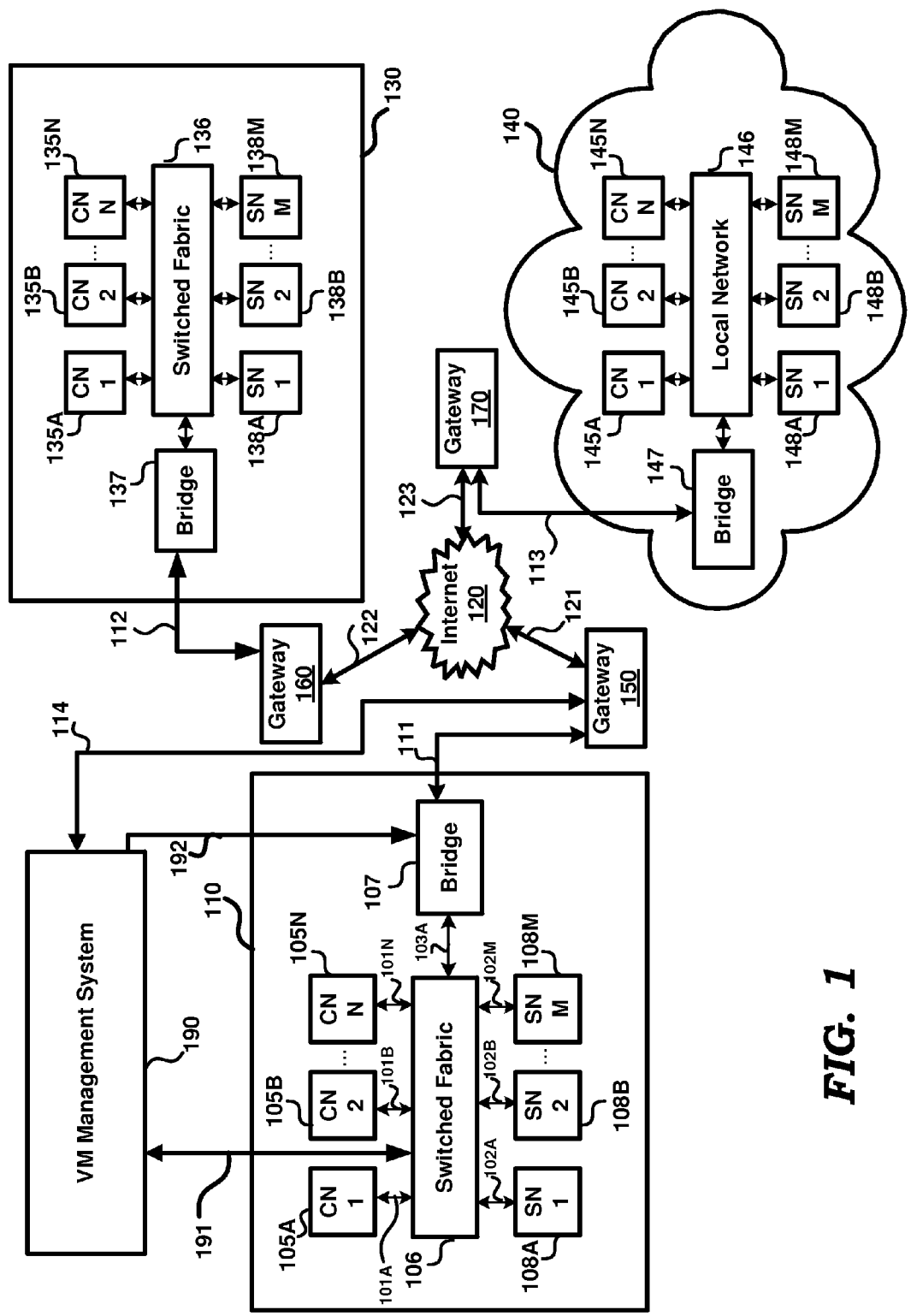
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing appliances 110 and 130, remote farm 140, gateways 150-170, VM management system 190, and Internet 120. Merely for illustration, only representative number/type of systems are shown in the Figure. Many environments often contain many more systems, both in number and type, depending on the purpose for which the environment is designed. Each system/device of FIG. 1 is described below in further detail.

Broadly, remote farm 140 represents a server farm housed in one or more associated data centers. Though shown as individual systems, appliances 110 and 130 may be part of respective server farms, or contained within a same server farm connected by IP protocol, as described below. In embodiments described below, each of appliances 110/130 and remote farm 140 is 'owned/operated' by a corresponding business entity and aspects of the present disclosure facilitate a VM in appliance 110 to be migrated to appliance 130 or remote farm 140 and vice versa.

Remote farm 140 represents a non-switched-fabric based computing system such as an Ethernet-based local area network, which rely on broadcast medium for providing connectivity. Remote farm 140 is shown containing various computing nodes 145A-145N, storage nodes 148A-148M, local network 146 and a bridge 147. Each component with a similar name (e.g., bridge, CN, SN) performs similar function as the corresponding component in appliance 110, and the description is not repeated for conciseness.

Appliance 130 is shown containing computing nodes 135A-135N, storage nodes 138A-138M, a switched fabric 136, and a bridge 137. Each of these components is connected in a similar fashion as the components in appliance 110, and performs similar functions as the components in appliance 110. Accordingly, the description of the components of appliance 130 is not repeated for conciseness.

Internet 120 facilitates the connectivity of appliance 110 with external systems such as appliance 130 and remote farm 140. Internet 120 may be implemented using protocols such as Transmission Control Protocol (TCP) and/or Internet Protocol (IP), well known in the relevant arts. In general, in TCP/IP environments, an IP datagram/packet is used as a basic unit of transport, with the source address being set to the IP address assigned to the source system from which the datagram originates and the destination address set to the IP address of the destination system to which the datagram is to be eventually delivered.

A (IP) datagram is said to be directed to a destination system when the destination IP address of the datagram is set to the (IP) address of the destination system, such that the datagram is eventually delivered to the destination system by Internet 120. When the datagram contains content such as port numbers, which specifies the destination application, the packet may be said to be directed to such application as well. The destination system may be required to keep the corresponding port numbers available/open, and process the datagrams with the corresponding destination ports. Internet 120 may be implemented using any combination of wire-based or wireless mediums.

Each of the gateways 150, 160, and 170 represents a router that routes each IP datagram from a source IP system to a destination IP system via Internet 120, based on the IP address in the IP destination field. Specifically, a gateway processes an incoming datagram by examining the datagram for a destination IP address, and forwards the datagram towards that destination system based on the IP address and routing information. Paths 111-114 and 121-123 represent the communication paths on which the IP datagrams are transported.

Appliance 110 is a switched fabric based computing system. Appliance 110 is shown containing computing nodes 105A-105N, storage nodes 108A-108M, a switched fabric 106, and a bridge 107. Each of these components is described below in further detail.

Each of storage nodes 108A-108M represents a non-volatile (persistent) storage component, facilitating storage and retrieval of data by applications executing in computing nodes 105A-105N. For example, storage nodes 108A-108M may be implemented to store data, which would be of interest to end-users interfacing with applications on computing nodes 105A-105N. Accordingly, storage nodes 108A-108M may be implemented as a database server using relational database technologies or as a network attached storage (NAS) or a file server, providing storage and retrieval of data by applications, as is well known in the relevant arts.

Computing nodes 105A-105N represent processing entities that may host one or more VMs, while potentially operating on the data stored in storage systems such as storage nodes 108A-108M. Computing nodes 105A-105N provide computational capabilities within appliance 110, and each computing node may be implemented as a blade server or a rack server, available from various vendors. Each virtual machine may have an associated layer-2 (e.g., Ethernet) and layer-3 (e.g., Internet protocol) address, which are unique in their respective operating network domains (e.g., VLAN technology or Internetworking technology).

Switched fabric 106 provides connectivity between any two nodes of computing nodes 105A-105N, storage nodes 108A-108M, and bridge 107 based on point-to-point connection (contrasted with broadcast medium of 802.3-type local networks). Each of the computing nodes 105A-105N, storage nodes 108A-108M, and bridge 107 is connected directly (instead of by switching on networks, etc.) to a corresponding port of switched fabric 106 by a physical link (shown as 101A-N, 102A-M, and 103A respectively) that offers bi-directional data communication between the nodes and switched fabric 106. Each physical link can contain multiple lines so that several bits can be transferred in parallel, including during the switching operation. Switched fabric 106 forwards incoming data from a source node to the port corresponding to a destination node based on identifiers of virtual machines or the bridge, to operate as a switch.

Bridge 107, provided according to an aspect of the present disclosure, supports virtual machines on appliance 110 to be migrated to external systems such as appliance 130 or remote farm 140 (as suited in the corresponding situation), and also enables virtual machines from external systems to be migrated to appliance 110, as described in sections below with examples.

VM management system 190 determines when and where to migrate VMs executing in several switched fabric computing systems (such as appliance 110) of an enterprise. Though only a single appliance 110 is shown as being served by VM management system 190 of the enterprise, several more of such appliances may be located within the enterprise and served by VM management system 190. For the purpose of further description below, it is assumed that appliance 130 and remote farm 140 are present external to such an enterprise. Though not shown, appliance 130 may have a corresponding VM management system in the enterprise in which appliance 130 is placed.

VM management system 190 may be implemented as software on a server, which can be part of the server farm housed in one or more associated data centers as described above. Using VM management system 190, an administrator can also manually initiate the migration of a VM to other appliances within the enterprise, or to an external system (i.e., appliances 130 or remote farm 140).

Assuming a VM is to be migrated to another appliance within the same/native enterprise, VM management system 190 thereafter operates in conjunction with the source and destination appliances to manage the migration. Such migration may be performed in a known way.

However there may be situations it may be desirable to migrate a VM to external enterprises, or to migrate VMs from external enterprises into appliance 110. The manner in which VMs in the enterprise may be migrated to external machines is described below with examples.

3. Migration of Virtual Machines

Figure 2:
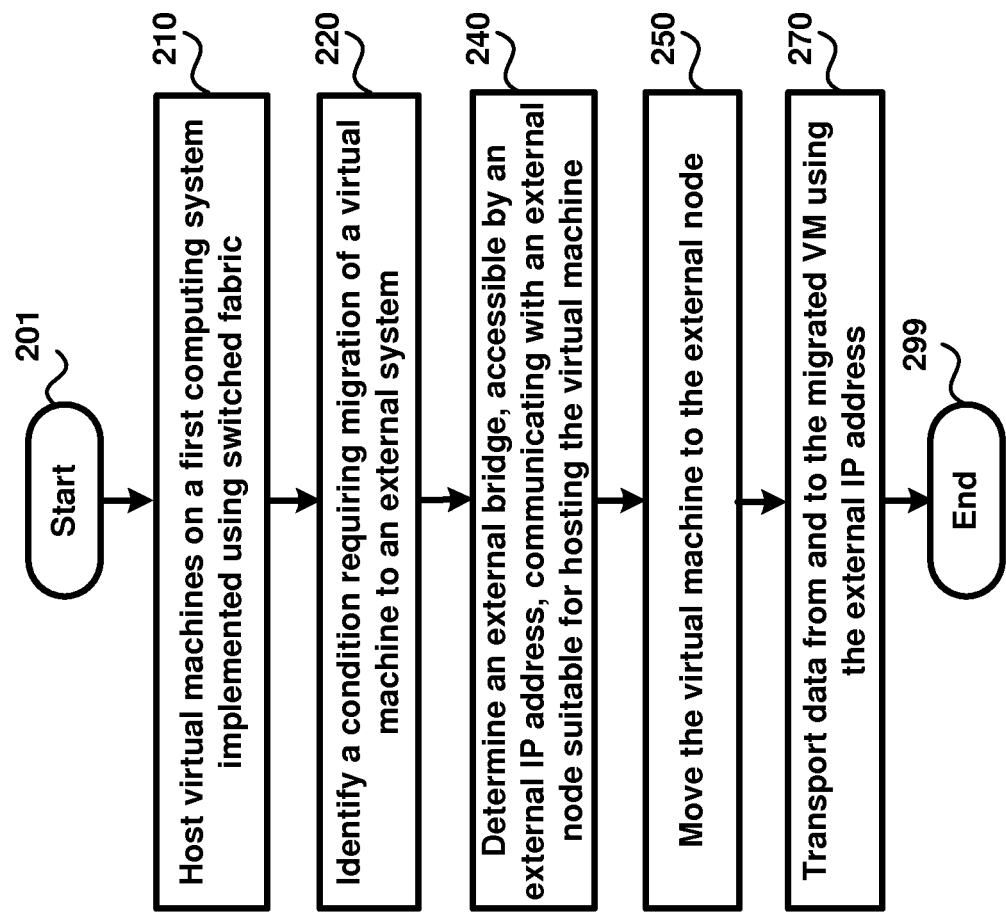
FIG. 2 is a flow chart illustrating the manner in which virtual machines are migrated, according to an aspect of the present disclosure.

FIG. 2 is a flow chart illustrating the manner in which VMs are migrated, according to an aspect of the present disclosure. The flowchart is described with respect to the systems of FIG. 1 merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, each computing node of appliance 110 hosts a corresponding set of VMs. Some of the VMs may be created on one node of appliance 110 and migrated successively to one or more of other nodes of appliance 130. A VM is said to be 'native' to a node/appliance at which the VM is first created/formed in operational state. Once the VM is moved to an external system (for example, as described below), the VM is said to be a 'migrated' VM in that external system. The system at which the VM was created as a native VM (and then migrated), is said to be a source system for that migrated VM. In general, the VMs hosted on a computing node execute while sharing the physical processing resources (processing units, random access memory, etc.) provided on the computing node.

In step 220, appliance 110 identifies a condition that requires migration of a VM from appliance 110 to an external system. The condition can be based on any parameters of interest, such as prior processing load on the various nodes in the appliances (including 110) in the enterprise, time of day/week/month, overhead of retaining a VM in appliance 110 versus migrating to an external system, etc. The conditions can be specified by an administrator in the form of rules in VM management system 190, and appliance 110 may thereafter determine the existence or occurrence of such a condition potentially in coordination with VM management system 190. Alternatively, a user may issue manual commands for the migration by utilizing the management software implemented on VM management system 190, on an as-needed basis. In general, it may be assumed that there are multiple such conditions, and one of such conditions is identified to have occurred in step 220.

In step 240, appliance 110 determines an external bridge contained in an external system that is suitable for hosting the virtual machine sought to be migrated, in cooperation with VM management system 190. The external bridge is accessible by an external IP address, and the external bridge communicates with a node of the external system that is suitable for hosting the virtual machine. The external system may be determined, for example, dynamically based on conditions on external systems, or based on administrator specified rules.

In an illustrative scenario, an owner/operator of appliance 110 may have contracted with the owner of external systems to host (migrated) VMs, and one of such external systems may be conveniently selected (based on rules, potentially) for hosting the migrated VM. As described below with example, the external system can be either switched-fabric based computing system or non-switched-fabric based (external) computing system, as suitably determined at the corresponding duration.

In step 250, appliance 110 causes the VM identified in step 220 to be moved to the external system, in cooperation with VM management system 190. Such moving may entail configuring a computer node of the external system with the various states (e.g., reflecting the states of various applications executing on the VM) internal to the migrating VM, and ceasing the execution of the VM on the computer node previously hosting the VM. Such tasks may be performed in a known way in cooperation with complementing implementation on the external system (and/or other systems in the farm housing the external system). For example, an image of the same type of VM may be used as a starting point on the external system, and configuring the image with the current state of the VM sought to be migrated, and then making the configured image operational.

In step 270, data is transported from and to the migrated VM using the external IP address of step 240. It should be appreciated that the data sought to be transported correspond to inter-VM packets designed to provide connectivity to applications on migrated VM (for example, as the applications access data via storage nodes) or when applications executing on native VMs of appliance 110 continue to communicate with applications executing on the migrated VM. In particular, data is transported in the form of IP datagrams having the external IP address as the destination address.

Continuity of communication to and from the migrated VM is supported by operation of step 270 (such that continuity of operation is provided for all applications, both internal to the migrated VM, and those from external systems/nodes communicating with the applications executing on the migrated VM). Thus, migration may be viewed as the combination of steps 250 and 270 together. The flow chart ends in step 299.

Due to the migration of VMs from appliance 110, more scalability is provided for applications executing on appliance 110. In addition, due to the migration of VMs from external systems to appliance 110, any excess computational capacity in appliance 110 may be used for hosting external VMs. Further, in view of using IP packets for transporting the inter-VM data, aspects of the present disclosure can be used to take advantage of the processing power of many external systems accessible via IP.

The features described above with respect to FIG. 2 can be implemented in various embodiments, as will be apparent to one skilled in the relevant arts by reading the disclosure provided herein. The description is continued illustrating the detailed architecture of appliance 110, in one embodiment.

4. Detailed Architecture

Figure 3:
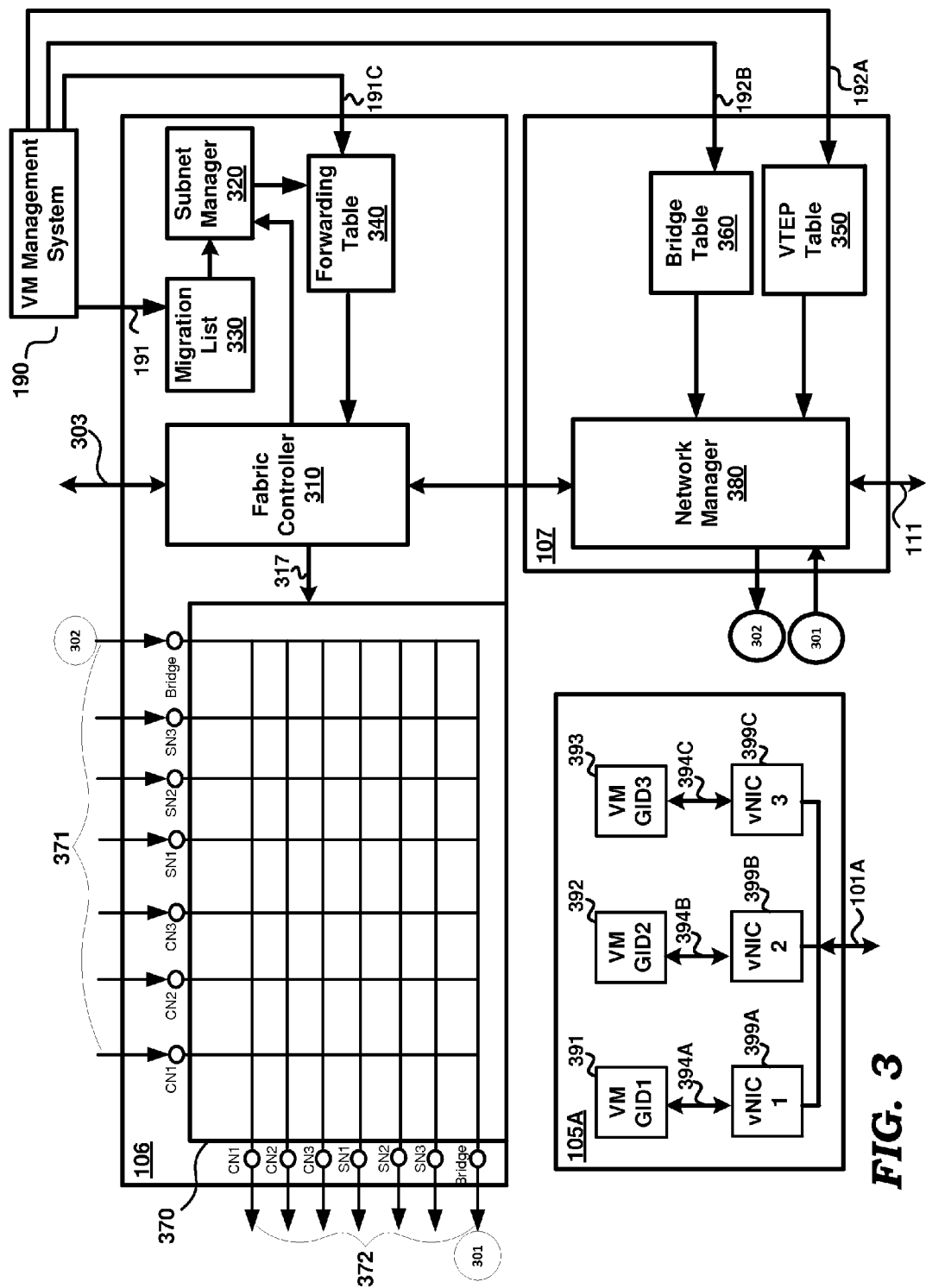
FIG. 3 is a block diagram illustrating the detailed architecture of some of the components of a switched fabric based computing system, in an embodiment.

FIG. 3 is a block diagram illustrating the detailed architecture of switched fabric 106, bridge 107, and computing node 105A of appliance 110 in one embodiment. Computing node 105A is shown containing VMs 391-393, and virtual network interface cards (vNIC) 399A-399C. Switched fabric 106 is shown containing crossbar 370, fabric controller 310, subnet manager 320, migration list 330, and forwarding table 340. VM management system 190 is shown with paths 191, 192A and 192B. Bridge 107 is shown containing network manager 380, VTEP table 350, and bridge table 360. Each of the blocks is described below in further detail.

Each VM 391-393 is shown communicating via a respective vNIC of vNICs 399A-399C (on a respective path of paths 394A-394C), and may thus have a medium access control (MAC) address and IP address. As described below, the MAC address is retained even after migration, and used as the basis for migrating the corresponding VM to external systems. Each VM is assumed to be connected to a corresponding port of switched fabric 106, and identified by a respective machine identifier (MID), which is a unique number within the corresponding appliance.

A MID may be represented by a global ID (GID) and/or a local ID (LID) depending on the particular implementation of the VMs in the IB fabric of appliance 110. To illustrate, the IB fabric of appliance 110 may be implemented using one or more IB subnets. An IB subnet is a group of ports available in an IB fabric, where the combination of such one or more IB subnets defines all the available ports in that particular IB fabric. In one implementation, if the number of desired VMs in appliance 110 is below the number of ports available in one IB subnet, all the VMs may be identified by respective LIDs. If, however, the number of desired VMs in appliance 110 is more than the number of ports available in one IB subnet, the VMs may be identified by respective GIDs, in addition to the LIDs.

For the purpose of the present disclosure it may be understood that each VM can be uniquely addressed by a corresponding MID, which can be either a GID or LID, as suited in the corresponding environment. In the description below, it is assumed that each MID corresponds to GID, in view of the large number of VMs that are hosted in some common environments.

Though not shown, each VM is assumed to be executing a corresponding set of user applications. In operation, each VM generates a base payload for sending to another VM. The corresponding vNIC thereafter encapsulates the base payload with a MAC header to generate a MAC frame. In addition, the MAC frame is further encapsulated with a fabric header suitable for switching (and also higher protocol layer functions). For the purpose of forwarding of the payload, it may be sufficient to appreciate that the fabric header contains MID. In case of Infiniband based switch fabric, the fabric header and the packet format is described in a document entitled, "Infiniband Architecture Specification, Volume 1", available from InfiniBand Trade Association Administration, 3855 SW 153rd Drive, Beaverton, Oreg. 97006 (Ph. No.: 503.619.0565), which document is incorporated in its entirety herewith.

Crossbar 370 provides point-to-point connection between various ports (101A-N, 102A-M, and 103A of FIG. 1) of switched fabric 106. Although crossbar 370 is shown implementing cross-bar architecture, any other architecture (e.g., banyan switches) providing point-to-point connection between various ports of switched fabric 106 may be employed. For ease of description, each bi-directional link to the port is shown separately as input path and output path. Thus CN1 in input paths 371 along with CN1 in output paths 372 represents the port corresponding to 101A of FIG. 1.

Crossbar 370 connects each input path to a specific output path (if a data packet is to be transferred) according to control signals received from fabric controller 310. Multiple point-to-point connection paths may be provided simultaneously, with each connection path between a corresponding pair of input/output ports for higher switching performance. In addition, each such connection path may be implemented as a bus to transfer multiple bits in parallel between the connected input and output port pair. Crossbar 370 may be implemented using any of various available technologies, including the IB technology noted above.

Forwarding table 340 contains connection data indicating the specific port on which each VM and bridge 107 is currently accessible. Bridge 107 and each VM of appliance 110 may be uniquely identified by an identifier (i.e., MID) and accordingly connection data may contain a mapping of the MID to the port number on which the corresponding VM/bridge are accessible.

Fabric controller 310 controls the switching operation of crossbar 370 by issuing the appropriate control signals on path 317. Fabric controller 310 receives data signals on path 303 indicating the MID of source VM (from which packet is being received) and the MID of destination VM (to which packet is to be sent). Fabric controller switches the packets to the appropriate output port based on data stored in forwarding table 340.

As may be readily appreciated, packets destined to local VMs are switched to corresponding output port (to which the node hosting the destination VM is coupled to). On the other hand, packets from in-migrated VMs and those destined for out-migrated VMs are switched to network manager 380 via 301. The control signals are issued on path 317 to connect each input path with the corresponding output path determined based on forwarding table 340.

Appliance 110 may implement one subnet manager for each switched fabric (as represented by block 320 being contained in switched fabric 106). Alternately, if appliance 110 contains multiple switched fabrics, a single subnet manager may be implemented for all such switched fabrics together.

VM management system 190 examines various data and identifies VMs that require migration from appliance 110 to an external system, based on existence or occurrence of condition(s) previously specified by an administrator. It then adds identifiers of such VMs to the migration list 330 through path 191. VM management system 190 may also add the migrated VM's IP addresses to the migration list 330 along with the identifiers of such VMs (i.e., MIDs).

Subsequently, when the identified VMs are moved from appliance 110 to an external system (as described with reference to step 250 of FIG. 2), subnet manager 320 receives a link-down event from VM management system 190 for the corresponding VMs (indicating that the moved VM is no longer accessible at the port provided by the forwarding table 340).

For each VM for which a link-down event is received, subnet manager 320 identifies the corresponding MIDs of the VMs from migration list 330, and updates the corresponding entry in forwarding table 340 to indicate that the VM is reachable at (in effect, via) bridge 107. Such updating implies that the packets originating in any of the local VMs destined to migrated VM would be forwarded to network manager 380 (at 301). In an embodiment, during migration, original VM image continues to be operational until new VM image is fully ready to start. When it is, the original VM is shutdown and the new one is started. This implies that during migration, the VMs do not lose ability to receive data for a long duration.

Alternatively, for each VM for which a link-down event is received, subnet manager 320 identifies the corresponding MIDs of the VMs from migration list 330, and deletes the forwarding table's (340) entry for that MID. Subnet manager 320 then uses the VM's IP address present in the migration list 330 to build and transmit a gratuitous ARP to the VM's subnet that maps the VM's IP address to the bridge's MID. The VMs that are in the same broadcast domain as the migrated VM update the mapping of the migrated VM's IP address to the bridge's MID when they receive the Gratuitous ARP. Thus all further packets destined to the migrated VM will be sent to bridge 107.

Migration list 330 contains identifiers of VMs that are determined to be suitable for migration from appliance 110 to external systems. VM management system 190 writes the MIDs of the to-be-migrated VMs in migration list 330. Similarly, in the event of manual commands being issued by an administrator using the VM management system 190 for the migration of VMs, the MIDs of such VMs is also written to migration list 330 by VM management system 190. Once migration is complete (including setup of all the pertinent data tables), the corresponding entries may be removed from migration list 330.

VM management system 190 facilitates the migration of VMs in and out of appliance 110, and also writes entries that are stored in VTEP table 350 and bridge table 360. VM management system 190 may communicate with the counterpart equivalent component of the external system, and determine the end point at the external system that supports the post-migration data transfer (similar to bridge 107) the migrated virtual machine (e.g., the IP address of the remote bridge at which the out-migrated VM is hosted). VM management system 190 writes the corresponding information in VTEP table 350. In particular, VM management system 190 updates VTEP table 350 to map each MAC address of a corresponding VM to the parameters which specify the end point (i.e., bridge 107 or counterpart in other systems) which supports packet transfers from and to the migrated VMs.

With respect to in-migration of VMs created on external systems, VM management system 190 may cooperate with a counterpart component to determine the end points at the external system and the appliance. In addition, VM management system 190 fetches the unique MID for the VM that was assigned by subnet manager 320, and updates bridge table 360 to indicate assignment of the created MID for the in-migrated VM. Subnet Manager 320 updates forwarding table 340 to reflect the specific node hosting the in-migrated VM. In particular, the created MID is mapped to the port connecting to the node hosting the in-migrated VM.

Each of the entries in the VTEP table 350 specify end points corresponding to remote VMs of interest, including VMs in appliance 110 that have been migrated out ("out-migrated VMs") of appliance 110, and the remote VMs with which the in-migrated VMs communicate. In an embodiment, VXLAN technology is used for connecting appliance 110 with appliance 130 and remote farm 140, and accordingly for each in-migrated and out-migrated VM, the parameters stored in the corresponding VTEP table 350 entry include an IP address of the bridge which serves the VM, the MAC address of the migrated/remote VM, and a virtual network identifier (VNI) identifying a segment of VXLAN over which the migrated VMs communicate with external systems. Although the VTEP table is shown as a single table for all VNIs, in other implementations, a single VTEP table may be provided for each VNI (VXLAN segment). The parameters are described below in further detail with respect to FIGS. 7A and 7B.

Bridge table 360 maintains mapping of VNIs to respective VMs that have in-migrated to, or out-migrated from appliance 110. Specifically, for each VM that has in-migrated to or out-migrated from appliance 110, an entry is stored in bridge table 360 that maps the VM's MAC address to the corresponding MID (within appliance 110), IP address, and VNI. Although the bridge table is shown as a single table for all VNIs, in other implementations, a single bridge table may be provided for each VNI. The content of bridge table 360 in the context of VXLAN technology is described below with respect to FIGS. 8A and 8B.

Network manager 380 works with the data structures provided in VTEP table 350 and bridge table 360 and facilitates continued data connectivity between migrated VMs and VMs that are native in appliances from which the migrated VMs migrate from. By providing continued data connectivity, network manager 380 provides for transfer of data to and from the migrated VMs.

The description is continued below with some examples, illustrating the migration of VMs between appliance 110, appliance 130, and remote farm 140.

5. Migration of VMs

Figure 4A:
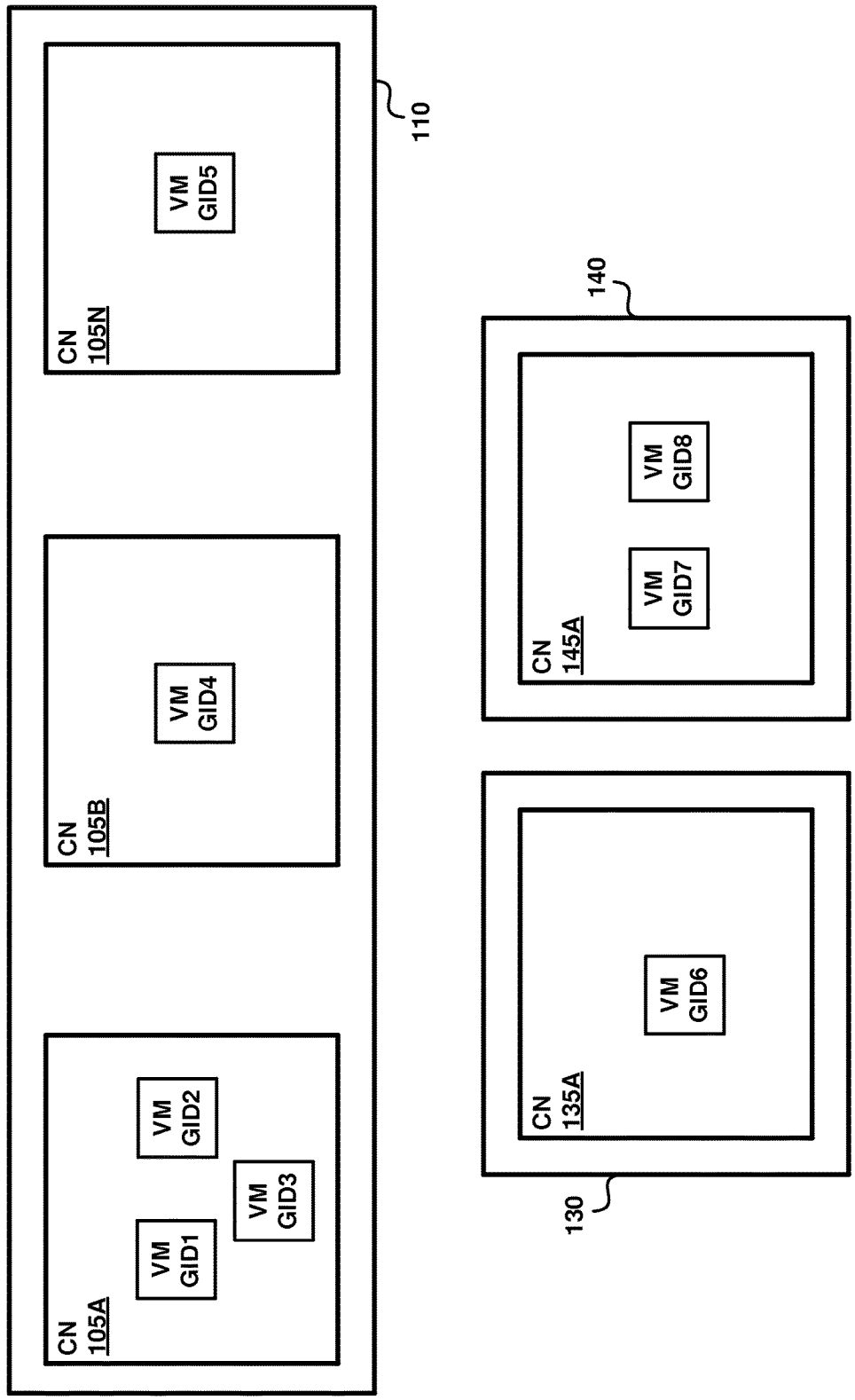
FIG. 4A depicts VMs hosted in various computing nodes at one time instance.
Figure 4B:
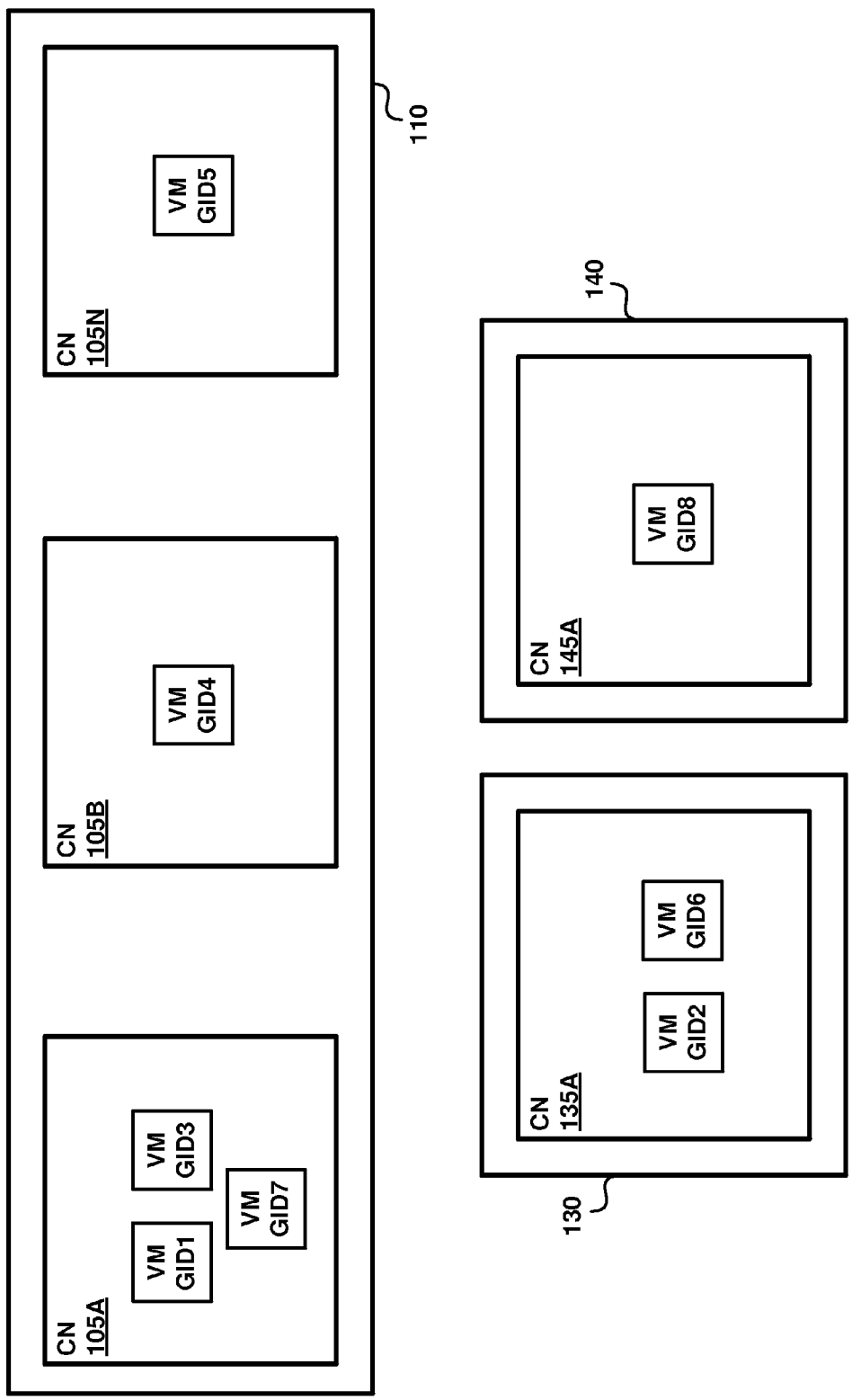
FIG. 4B depicts VMs hosted in computing nodes after migration of some of the VMs at another time instance.

FIGS. 4A and 4B together show the migration of VMs hosted within computing nodes of appliance 110, appliance 130, and remote farm 140 at time instances before and after the migration of VMs. Though only VMs are shown to be migrated, the corresponding vNICs are also transported to the corresponding destination nodes (along with the migrated VMs).

The migration of VMs is shown with respect to certain computing nodes of FIG. 1 merely for illustration. However, the features can be implemented in other computing nodes and with any number of VMs (from remote farm 140 to appliance 110 and vice versa, from appliance 130 to appliance 110 and vice versa) without departing from the scope and spirit of various aspects of the present disclosure, as will be apparent to one skilled in the relevant arts by reading the disclosure provided herein.

Referring to FIG. 4A (representing a first instance of time), appliance 110 is shown containing computing nodes 105A, 105B, and 105N. In computing node 105A, three VMs (with GIDs 1, 2, and 3) are shown hosted. In computing node 105B, one VM (GID4) is shown hosted. In computing node 105N, one VM (GID5) is shown hosted. Appliance 130 is shown containing one computing node 135A, hosting one VM (with GID 6). Remote farm 140 is shown containing one computing node 145A, hosting two VMs (with GIDs 7 and 8). Although MIDs are shown as being implemented as GIDs for the purposes of illustration, it will be apparent to one skilled in the art by reading the disclosure provided herein that MIDs can be extended to be implemented as LIDs in case of smaller scale environments, without departing from the scope and spirit of the disclosure.

Referring to FIG. 4B (representing a second instance of time that occurs after the first instance of time), appliance 110 is shown containing computing nodes 105A, 105B, and 105N. In computing node 105A, three VMs (with GIDs 1, 3, and 7) are shown hosted, showing a migration of VM GID2 away from appliance 110, and an in-migration of VM7 to appliance 110. There are no changes shown in computing nodes 105B and 105N. Appliance 130 is shown with one computing node 135A, hosting two VMs (with GIDs 2 and 6), showing the migration of VM GID2 from appliance 110 to appliance 130. Remote farm 140 is shown with one computing node 145A, hosting one VM (with GID8), showing the migration of VM GID7 from remote farm 140 to appliance 110.

The description is continued below with some examples, illustrating the transfer of data between VMs on appliance 110 and appliance 130 using VXLAN (Virtual Extensible LAN) technology.

6. Data Transfer Using VXLAN Technology

Figure 5:
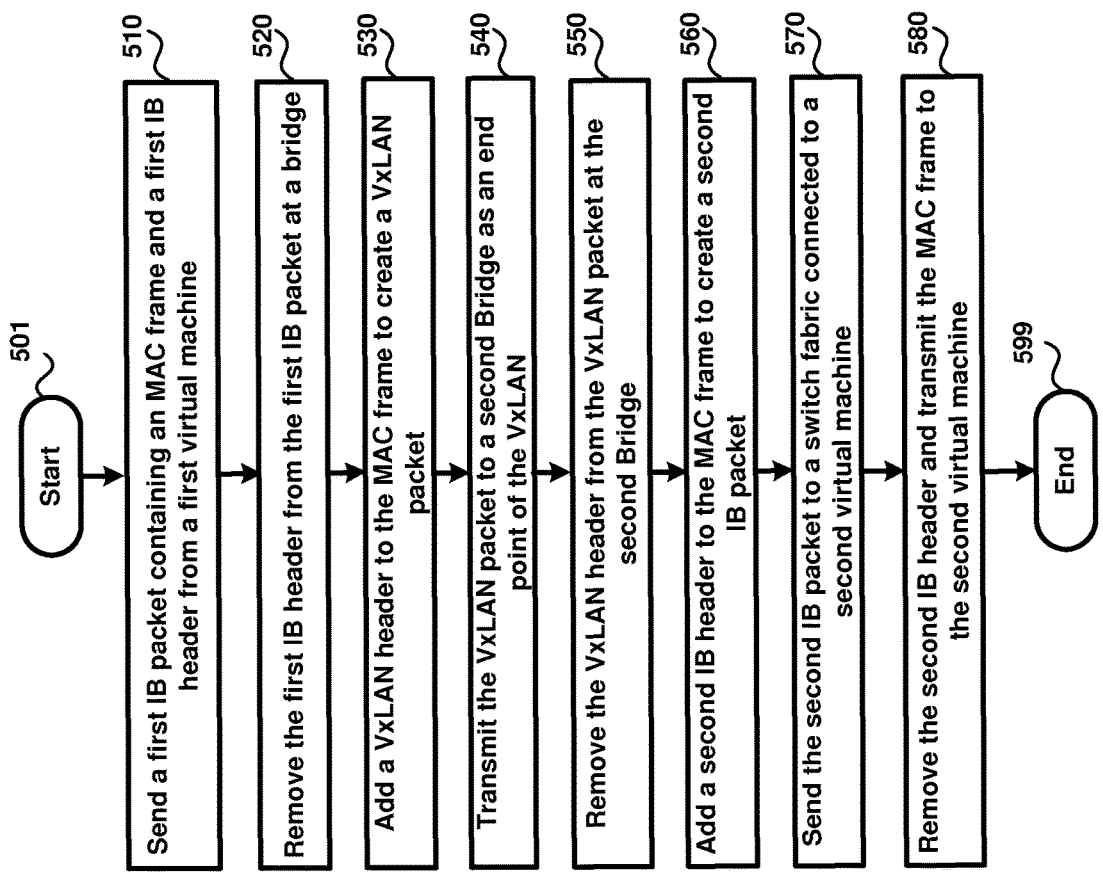
FIG. 5 is a flow chart illustrating the manner in which data is transferred to migrated virtual machines in an embodiment.

FIG. 5 is a flow chart illustrating the manner in which data is transferred from a switched fabric based computing system to an external system using VXLAN technology, according to an aspect of the present disclosure. The description corresponds to only the case of transferring packets from the native/local VM GID1 of node 105A to VM GID2, which was shown to have migrated to node 135A in FIG. 4B. The packet formats for the various other cases will be apparent to one skilled in the relevant arts by reading the disclosure provided herein, and is not repeated here for conciseness. The flow chart begins in step 501, in which control immediately passes to step 510.

In step 510, vNIC 399A on appliance 110 sends a first IB packet to VM GID2 that has been migrated to the external system appliance 130. It is assumed that the data payload of the IB packet is received on path 394A from VM GID1. The first IB packet contains the data payload, a MAC header, and a first IB header. The data payload and the MAC header together may be viewed as a MAC frame. The MAC header specifies the MAC addresses for the source VM and the destination VM. The IB header specifies GID1 as the source MID and GID2 as the destination MID. Fabric controller 310 accordingly switches the packet to bridge 107 based on the content of forwarding table 340.

In step 520, bridge 107 removes the first IB header from the first IB packet, thereby recovering the original MAC frame.

In step 530, bridge 107 adds a VXLAN header, a UDP header, an IP header, and an outer Ethernet header to the MAC frame to form a VXLAN packet (as described in further detail in RFC 7348 entitled, "Virtual eXtensible Local Area Network (VXLAN): A Framework for Overlaying Virtualized Layer 2 Networks over Layer 3 Networks").

Specifically, the outer Ethernet header contains the MAC address for the source (i.e., bridge 107), MAC address for the first intermediate destination in the path to reach VM GID 2 (i.e., gateway 150), IP addresses for the source (i.e., bridge 107) and destination (i.e., bridge 137). All the fields added outside of the basic/original MAC frame (including fields 910-935 in FIG. 9B, described below), may be termed as an outer header.

Bridge 107 determines the IP address of the destination bridge 137 based on the corresponding entry in VTEP table 350 for VM GID 2, which specifies the IP address of the destination bridge with reference to VM GID 2. Bridge 137 is remote bridge that is connected to appliance 130 at which the out-migrated VM is hosted, and is therefore the end point of the VXLAN connection.

The VXLAN packet is then sent from the first router (gateway 150) to the second router (gateway 160). As the packet is sent from gateway 150 to gateway 160, the MAC addresses (or layer-2 address, in general) for the source and destination in the outer Ethernet header are updated to reflect the corresponding MAC addresses for gateway 150 and gateway 160.

In step 540, the VXLAN packet is transmitted to the second bridge 137 as the end point of the VXLAN connection from the second router, gateway 160. Second bridge 137 is part of the external system, i.e., appliance 130, hosting the migrated VM GID2. Second bridge 137 is in communication with a corresponding fabric controller in appliance 130, which in turn communicates with the destination VM GID2 through a corresponding crossbar framework.

In step 550, bridge 137 removes the VXLAN header from the VXLAN packet to recover the original MAC frame.

In step 560, bridge 137 adds a second IB header to the MAC frame to create a second IB packet. The second 113 packet contains the original MAC frame along with the second 113 header. It should be appreciated that the IB header facilitates the packet to be switched for the switched fabric, and thus the MAC frame with the IB header may be referred to as a 'switched packet'.

In step 570, bridge 137 sends the second IB packet to a switched fabric 136 connected to the second VM GID2. The corresponding fabric controller in appliance 130 switches the packet to VM GID 2 based on the content of a corresponding forwarding table.

In step 580, the second 113 header is removed from the second IB packet (after completion of switching by the switch fabric 106) and the resulting MAC frame is transmitted to the second VM GID 2. The flow chart ends in step 599.

Although the examples above have been made with reference to a data packet being sent from one switched fabric based computing system (110) to another switched fabric based computing system (130), aspects of the present disclosure can be extended with reference to a data packet being sent from a switched fabric based computing system (110) to a non-switched-fabric based computing system (140), as will be apparent to a skilled practitioner.

In particular, in the event of the data payload arriving at the non-switched-fabric based computing system encapsulated in a VXLAN packet, the data payload may be processed using corresponding technology implemented on the external system (140) for forwarding the original MAC frame to the destination VM. For example, in remote farm 140 that represents a non-switched-fabric based computing system such as an Ethernet-based local area network, local network 146 may rely on Ethernet broadcast to send the MAC frame of step 550 to the destination VM, as would be readily understood by those skilled in the relevant arts.

It may thus be appreciated that by removing the IB header in step 520, the approach of FIG. 5 is able to interoperate with processing nodes implemented in switched fabric environments as well as non-switched-fabric environments. However, in case a destination VM is located in a switched Infiniband fabric based appliances, a suitable IB header is added in step 560, as described above.

The features described above with respect to FIG. 5 can be implemented in various embodiments, as will be apparent to one skilled in the relevant arts by reading the disclosure provided herein. The description is continued below with some examples, illustrating changes in corresponding data structures before and after the migrations of VMs shown with reference to FIGS. 4A and 4B.

7. Data Structures

FIGS. 6A-8E illustrates the manner (logically) in which data is maintained in relation to VM migration in one embodiment. As with the examples in FIGS. 4A, 4B, and 5, although MIDs are shown in FIGS. 6A-8E as being implemented as GIDs, it will be apparent to one skilled in the art by reading the disclosure provided herein that MIDs can be extended to be implemented as LIDs in case of smaller scale environments, without departing from the spirit of the disclosure.

Figure 6A:
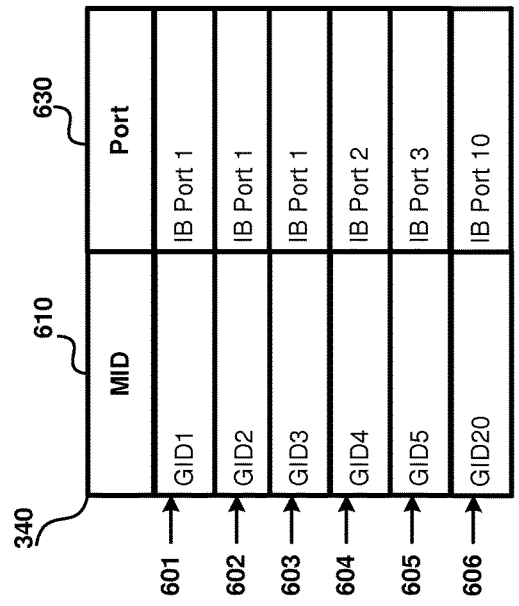
FIG. 6A depicts the content of a forwarding table prior to VM migration, in an embodiment of the present disclosure.
Figure 6B:
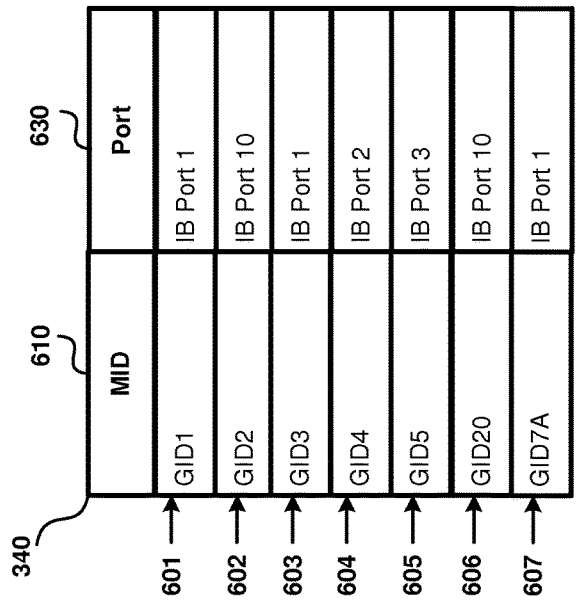
FIG. 6B depicts the content of a forwarding table after VM migration, in an embodiment of the present disclosure.

FIG. 6A shows the state of forwarding table 340 in appliance 110 at a first time instance, prior to the migration of VMs, and FIG. 6B shows the state of forwarding table 340 at a second time instance after the migration of VMs.

Referring to FIG. 6A, forwarding table 340 there depicts a portion of connections data maintained in switched fabric 106 prior to the migration of VMs shown in FIG. 4A. Column 610 ("MID") specifies a GID for bridge 107 and for each VM in each computing node of appliance 110. Column 630 ("Port") specifies the port number in switched fabric 106, which uniquely identifies the port to which the bridge connects to, or the node hosting the corresponding VM connects to. Any data to the VM/bridge identified in column 610 is routed to the port number identified in column 630.

Each of rows 601-606 specifies the connection details of a particular VM or of bridge 107 represented in switched fabric 106. In particular, row 601 specifies that the VM with a MID of GID1 is accessible via IB Port 1 such that all data sent to VM GID1 will be forwarded by switched fabric 106 to IB Port 1. Similarly other VMs (rows 602-605) with corresponding GIDs are shown with their corresponding connection ports. Additionally, row 606 specifies that bridge 107 with a MID of GID20 is accessible via IB Port 10 such that all data sent to the bridge will be forwarded by switched fabric 106 to IB Port 10.

It is also pertinent to note that VMs on the same computing node may be configured to be connected to the same port number in switched fabric 106. For instance, GIDs 1, 2, and 3, previously shown in FIG. 3 as having been contained in the same computing node 105A, are all shown to be associated with the same port number 1.

Referring to FIG. 6B, forwarding table 340 depicts a portion of connections data maintained in switched fabric 106 after migration of VMs shown in FIG. 4B.

Row 602, which previously showed VM GID2 connected to IB Port 1, now shows VM GID2 being connected to IB Port 10. IB Port 10 is the port number on switched fabric 106 that is connected to bridge 107 (as shown by row 606). As noted earlier, any VM (such as VM GID2) that migrates away from any computing node within appliance 110 is assigned the port number of bridge 107, so that any data directed towards the migrated VM is thereafter sent to bridge 107 at port 10 for further processing.

Newly created row 607 contains the GID information for VM GID7. As previously shown in FIG. 4B, VM GID7 migrated from remote farm 140 to computing node 105A of appliance 110. For the purpose of illustrating that VM management system 190 assigns a new MID to the in-migrated VM, the GID of the in-migrated VM is shown as GID7A to represent the updated MID assigned to the VM which was previously identified (prior to migration) with a GID7. As with the other VMs on computing node 105A (i.e., GID1 and GID3), the newly migrated VM GID7A is also assigned the same port (i.e., IB Port 1) on switched fabric 106. IB Port 1 now accepts all data directed towards the newly migrated VM GID7A. The content of the rest of the rows (601, 603-606) remain unchanged from the previously shown content of forwarding table 340 in FIG. 6A.

Figure 7A:
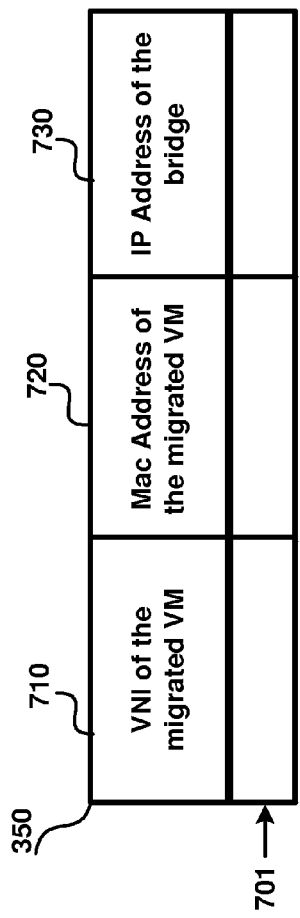
FIG. 7A depicts the content of a VTEP table prior to VM migration, in an embodiment of the present disclosure.
Figure 7B:
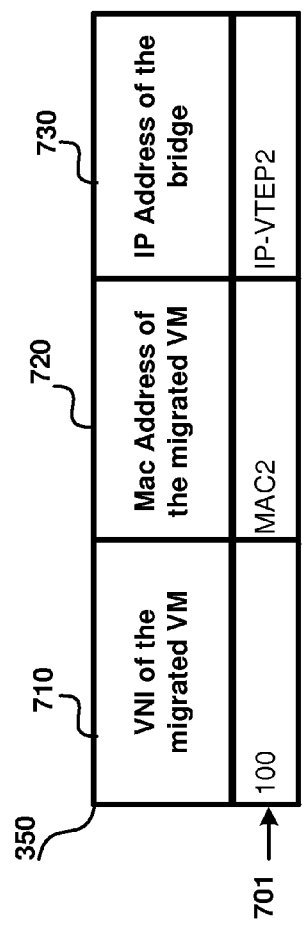
FIG. 7B depicts the content of a VTEP table after VM migration, in an embodiment of the present disclosure.

FIG. 7A shows the state of VTEP table 350 in appliance 110 at a first time instance, prior to the migration of VMs, and FIG. 7B shows the state of VTEP table 350 at a second time instance after the migration of VMs.

Referring to FIG. 7A, VTEP table 350 depicts the VTEP table data of remote VMs with which in-migrated VMs communicate, and data of out-migrated VMs maintained in bridge 107 prior to the migration of VMs, as shown in FIG. 4A. Since there are no VM migrations at the time instance of FIG. 4A, VTEP table 350 is shown empty.

Referring to FIG. 7B, VTEP table 350 depicts the VTEP data of remote VMs with which in-migrated VMs communicate, and data of out-migrated VMs maintained in bridge 107 after the migration of VMs to and from appliance 110 as shown in FIG. 4B. Since one VM GID2 migrated away from appliance 110 at the time instance corresponding to FIG. 4B, and since no in-migrated VM (e.g., VM GID7A) is shown communicating (e.g., to send data) with remote VMs (e.g., VM GID8), VTEP table 350 is shown with one entry. The entries in VTEP table 350 are updated by VM management system 190, as previously described.

Column 710 ("VNI of the migrated VM") specifies a VXLAN Network Identifier (VNI) for the corresponding migrated or remote VM. As is well known in the relevant arts, each VNI uniquely identifies a corresponding VXLAN segment hosting several MAC nodes. Different VMs (even in the same computing node) can be part of different VXLAN segments, and therefore be assigned different VNIs.

Column 720 ("Mac Address of the migrated VM") specifies the MAC address for the migrated or remote VM. As noted earlier, each VM in appliance 110, appliance 130, and remote farm 140 is assigned a MAC address at the time of instantiating the VM in the corresponding native system, and the MAC address is retained by the VM both pre and post migration.

Column 730 ("IP Address of the bridge") specifies an IP address of the bridge of the system that hosts the migrated or remote VM. A VTEP (VXLAN Tunnel Endpoint) represents an endpoint of a tunnel (implemented on UDP) for terminating the VXLAN packets. Since it is the bridge that accepts any incoming VXLAN packets directed to the migrated or remote VM, the IP address of the bridge (hosting the VTEP) is stored in this column.

Row 701 specifies the address details of the corresponding out-migrated VM. In particular, row 701 specifies that the out-migrated VM communicates over the network using a VNI of 100, and has a MAC address "MAC2". The IP address of the remote bridge 137 hosting the out-migrated VM is "IP-VTEP2".

FIG. 8A shows the state of bridge table 360 in appliance 110 at a first time instance, prior to the migration of VMs, and FIG. 8B shows the state of bridge table 360 at a second time instance after the migration of VMs.

Referring to FIG. 8A, bridge table 360 depicts the bridge table data of in-migrated and out-migrated VMs maintained in bridge 107 prior to the migration of VMs, as shown in FIG. 4A. Since there are no VM migrations at the time instance corresponding to FIG. 4A, bridge table 360 is shown empty.

Referring to FIG. 8B, bridge table 360 depicts the bridge table data of migrated VMs maintained in bridge 107 after the migration of VMs to and from appliance 110 as shown in FIG. 4B. Since one VM GID2 migrated away from appliance 110 and another VM GID7 migrated into appliance 110 at the time instance corresponding to FIG. 4B, bridge table 360 is shown with two entries. The entries in bridge table 360 are updated by VM management system 190, as previously described.

Column 810 ("Mac Address of the migrated VM") specifies the unique MAC address for the migrated VMs. Since the MAC address is assigned at the time of instantiation of the VM in the VMs native system, and since the unique MAC address is retained by the VM both pre and post migration, the MAC address shown in this column is the same as that carried by the migrated VMs prior to their migration.

Column 820 ("MID of the migrated VM locally") specifies a MID for each migrated VM, which is assigned to the VM locally within the system where the VM migrates to.

Column 830 ("IP Address of the migrated VM") specifies the IP address of the migrated VM, which like the VMs MAC address is assigned at the time of instantiation of the VM in the VMs native system, and is retained by the VM both pre and post migration.

Column 840 ("VNI of the migrated VM") specifies VNI over which the migrated VM communicates.

Row 801 specifies the address details of the corresponding out-migrated VM GID2. In particular, row 801 specifies that the GID of the out-migrated VM is GID2 (same value as pre-migration), the MAC and IP addresses of the out-migrated VM are MAC2 and IP2 respectively, and that VM GID2 communicates over the network using a VNI of 100.

Row 802 specifies the address details of the corresponding in-migrated VM GID7A (a new value assigned to the VM by Subnet Manager 320, upon in-migration from remote farm 140). In particular, row 802 specifies that the GID of the in-migrated VM is GID7A, the MAC and IP addresses of the in-migrated VM are MAC7 and IP7 respectively, and that VM GID7A communicates over the network using a VNI of 200.

FIGS. 8C, 8D, and 8E illustrate the manner (logically) in which forwarding, VTEP and bridge table data of migrated VMs is maintained in appliance 130, where VM GID2 has out-migrated from appliance 110. Each column of FIGS. 8C-8E has the same title/operation as the corresponding column of FIGS. 6A, 7A, and 8A respectively, and the description is not repeated for conciseness.

Referring to FIG. 8C, forwarding table 850 depicts the forwarding table data maintained in switched fabric 136 after migration of VMs into appliance 130 shown in FIG. 4B.

Row 803 specifies that the native VM with a MID of GID6 is mapped to IB Port 11 (within appliance 130) such that all data addressed to VM GID6 will be forwarded by switched fabric 136 to IB Port 11. Row 804 specifies that bridge 137 with a MID of GID40 is accessible via IB Port 20 such that all data sent to the bridge will be forwarded by switched fabric 136 to IB Port 20. Row 805 contains GID and port information for the in-migrated VM GID2A (a new value assigned to the VM by a corresponding subnet manager in appliance 130, upon in-migration from appliance 110). Row 805 shows VM GID2A being connected to IB Port 11. As with the other VM on computing node 135A (i.e., GID6), the newly migrated VM GID2A is also assigned the same port (i.e., IB Port 11) on switched fabric 136. IB Port 11 now accepts all data directed towards the newly migrated VM GID2A.

Referring to FIG. 8D, VTEP table 860 depicts the VTEP table data of a remote VM maintained in bridge 137 after the in-migrated VM GID2A communicates with remote VM GID1. Row 806 specifies the address details of a remote VM GID1. In particular, row 806 specifies that the remote VM communicates over the network using a VNI of 100, and has a MAC address "MAC1". The IP address of bridge 107 hosting the remote VM is "IP-VTEP1".

Referring to FIG. 8E, bridge table 870 depicts the bridge table data of migrated VMs maintained in bridge 137 after the migration of VMs as shown in FIG. 4B. Since one VM (GID2) in-migrated to appliance 130 from appliance 110 at the time instance corresponding to FIG. 4B, bridge table 870 is shown with one entry. The entries in bridge table 870 are updated by a corresponding VM management system in appliance 130.

Row 807 specifies the address details of the corresponding in-migrated VM GID2A. In particular, row 807 specifies that the GID of the in-migrated VM is GID2A, the MAC and IP addresses of the in-migrated VM are MAC2 and IP2 respectively, and that VM GID2A communicates over the network using a VNI of 100.

The manner in which the data is transported using the data structures thus maintained, is described below with examples.

8. Forwarding of Data

Network manager 380 facilitates transporting of data from and to migrated VMs using the external IP address. The operation of network manager 380 in facilitating the transport of data is described below with reference to data sent from a native VM to an out-migrated VM and vice-versa.

Consider the case of data being sent from VM GID1 to VM GID2. As shown in FIGS. 4A and 4B, VM GID2 migrated from appliance 110 to appliance 130. VM GID1 generates a base payload for sending to VM GID2. vNIC 399A thereafter encapsulates the base payload with a MAC header to generate a MAC frame. In addition, the MAC frame is further encapsulated with an IB header suitable for switching, thus forming an IB packet.

As noted above, upon migration of VM GID2, forwarding table 340 in appliance 110 is updated such that any data directed towards VM GID2 is sent to IB Port 10 (at which bridge 107 is connected to switched fabric 106). Therefore, due to the corresponding configuration of forwarding table 340, when switched fabric 106 receives the IB packet destined to VM GID2, the IB packet is sent to network manager 380 at bridge 107 for further processing.

Among other things, the IB packet contains the GID for the source VM and the destination VM. Network manager 380 examines bridge table 360 to retrieve the VNI and MAC address corresponding to the migrated VM based on the GID of the destination VM present in the received IB packet. To illustrate, network manager 380 examines bridge table 360 shown in FIG. 8B and finds a match for GID2 in row 801. It then retrieves the VNI (100) and the MAC address (MAC2) of VM GID2 based on the GID match.

Thereafter, based on the retrieved VNI entry and MAC address, network manager 380 examines the VTEP table 350 to retrieve the IP address of the remote bridge hosting the out-migrated VM GID2. To illustrate, network manager 380 examines bridge table 350 shown in FIG. 7B to retrieve the IP address IP-VTEP2 for the destination VM GID2 based on matching the VMs VNI and MAC address as shown in row 701.

Network manager 380 strips the IB packet of the IB header and generates a VXLAN packet based on the parameters of the entry (e.g., the IP address of the destination VTEP/bridge) found in the VTEP table 350. Specifically, once the IB header is stripped from the IB packet, the original MAC frame is exposed for further processing. The original MAC frame is encapsulated with a VXLAN header (that uses the VNI information found in VTEP table 350), a UDP header, an IP header (that uses the IP address of the destination bridge found in VTEP table 350), and optionally, an outer Ethernet header that contains the MAC addresses of the source and destination VTEP end points. The VXLAN packet is then sent as a corresponding datagram on path 111.

Upon reaching the destination bridge 137, the VXLAN packet is examined by a corresponding network manager on bridge 137. First, the corresponding network manager examines the relevant bridge table entry, i.e., row 807 in bridge table 870 shown in FIG. 8E, based on the VNI present in the received VXLAN packet. Then, the corresponding network manager retrieves the GID of the destination VM based on the MAC address of the destination VM specified in the VXLAN packet. The corresponding network manger then strips the VXLAN packet to expose the base payload and transmits the base payload to the destination VM (with the bridge as the source) based on the corresponding entry in the forwarding table 850 (i.e., row 805 in table 850 shown in FIG. 8C). The base payload is encapsulated in an IB frame during the transport of the payload from bridge 137 to VM GID2A. However, prior to the delivery of the base payload to the destination VM, the IB and MAC frames are removed by a corresponding vNIC in communication with destination VM GID2A.

Consider the case of data being sent from VM GID2A to VM GID1. VM GID2A generates a base payload for sending to VM GID1. In an embodiment, when VM GID2A migrates to appliance 130, all the internal routing tables of VM GID2A are reset such that VM GID2A no longer has internal references of GIDs to VMs that are native to appliance 110.

After the re-set of internal routing tables, and prior to sending a data packet for the first time, an ARP request is issued by VM GID2A to determine the address parameters (MID and MAC address) of the destination VM (i.e., the intended recipient of the data packet). The ARP request is processed by bridge 137, which creates a multicast IP packet with the ARP request in it and forwards the multicast to all VTEPs in the VNI over which VM GID2A communicates.

Thereafter, bridge 107 receives the multicast packet and sends the ARP request to VM GID1. VM GID1 then creates a unicast ARP reply and sends the reply to bridge 107, which embeds the reply in a VxLAN packet and sends it to bridge 137.

Upon receiving the unicast packet, bridge 137 creates an entry in its VTEP table (i.e., entry 806 in FIG. 8D) and stores the MAC address of VM GID1 and the IP address of the bridge 107 (IP-VTEP1) in the VTEP table. Bridge 137 then sends the MAC address of VM GID1 to VM GID2A as a response to the ARP request. The ARP response may further specify that the MID of bridge 137 (i.e., GID40) as being the MID of GID1 (even though VM GID1 has some other MID within appliance 110). In general, the MID of all VMs in native appliance 110 (from which VMs have migrated in to appliance 130) is mapped to GID40 in appliance 130.

VM GID2A then sends a base payload (data) destined to VM GID1. A vNIC in communication with VM GID2A thereafter encapsulates the base payload with a MAC header to generate a MAC frame. In addition, the MAC frame is further encapsulated with an IB header (with the local bridge MID of GID40 as the fabric header destination) suitable for switching, thus forming an IB packet. The corresponding network manager on bridge 137 strips the IB packet of the IB frame and encapsulates the exposed MAC frame in a VXLAN packet using the VTEP and MAC address information in the VTEP table of FIG. 8D. The encapsulation of the VXLAN packet is performed in a similar fashion as described with reference to the transport of data from VM GID1 to VM GID2 above.

Once the VXLAN packet is received at bridge 107, network manager 380 examines the relevant bridge table entry, i.e., row 801 in bridge table 360 shown in FIG. 8B, based on the destination MAC address of payload frame and VNI present in the received VXLAN packet. If no matching entry is found, then network manager 380 examines an internal table (not shown) maintained on appliance 110 to determine the GID for the destination VM (GID1) based on the MAC/IP destination addresses in the payload of the VXLAN packet. The internal table can be populated based on ARP type protocols and also examination of source MID of various packets received from fabric controller 310. For example, if the internal table also does not have a matching entry, then an ARP request for that MAC address is sent by bridge 107 to a Multicast GID of the IB partition mapped to that VNI. This is received only by VMs of that partition/tenant. The reply uniquely identifies the GID within that IB partition/VNI. Network manager 380 then sends the packet using the GID in the response as destination GID. In an alternate embodiment, an entry is created in the bridge table for such a VM GID so that further packets over VXLAN can find the entry in the bridge table 360.

Upon determining the GIDs for destination VM, network manager 380 removes the VXLAN header from the VXLAN packet to recover the original MAC frame. Thereafter, network manager 380 adds an IB header to the MAC frame to create an IB packet. The IB packet is sent to switched fabric 106, which then sends the IB packet to VM GID1 through normal switching operation described above.

It may thus be appreciated that when a VM is migrated from one switched fabric based appliance to another similar appliance, packets continue to be transported to and from the other VMs in the native appliance, without the applications/VMs necessarily being aware of the migration.

It may be further appreciated that implementation of bridge 147 will be apparent to one skilled in the relevant arts at least based on the description of above. In particular, in case of packets being received from appliance 110, once bridge 147 has recovered the original MAC frame, the destination MAC address can be used to deliver the packet to the local computing node hosting the destination VM. In case of transfer of packets from an in-migrated VM in remote farm 140 to VMs in native appliance 110, bridge 147 may operate as a proxy ARP (similar to bridge 137) in answering the ARP requests directed to VMs in native appliance 110, and thereafter forward the received base MAC packets as VXLAN packets in a known way.

Thus by stripping off the IB header of data packets before being transported on Internet 120, the approaches described above enable VMs in appliance 110 to be migrated to switched fabric based computing systems (i.e., appliance 130 in the above example) or non-switched-fabric based computing systems (140).

The description is continued with respect to format of the data packets when transported from a source VM to a destination VM is described below with examples.

9. Packet Formats

As described above with reference to FIG. 5 and FIGS. 6A-8E, the original MAC frame is transported to the destination VM after different stages of encapsulation. Specifically, the original MAC frame is initially encapsulated in an IB header to form an IB packet. Thereafter, the IB header is removed and the MAC frame is encapsulated by VXLAN header prior to sending the resulting VXLAN packet to the destination bridge. It may be understood that the original MAC frame uses Ethernet-over-IB (EoIB) encapsulation and then VXLAN encapsulation. It is also possible that the original frame is an IP packet that is encapsulated in an IB packet initially. This type of encapsulation is referred to as Internet-Protocol-over-IB (IPoIB). Thereafter, the IB header is removed and the IP packet is encapsulated by VXLAN header prior to sending the resulting VXLAN to the destination bridge. In the description below it is assumed that EoIB and VXLAN are used.

Figure 9A:
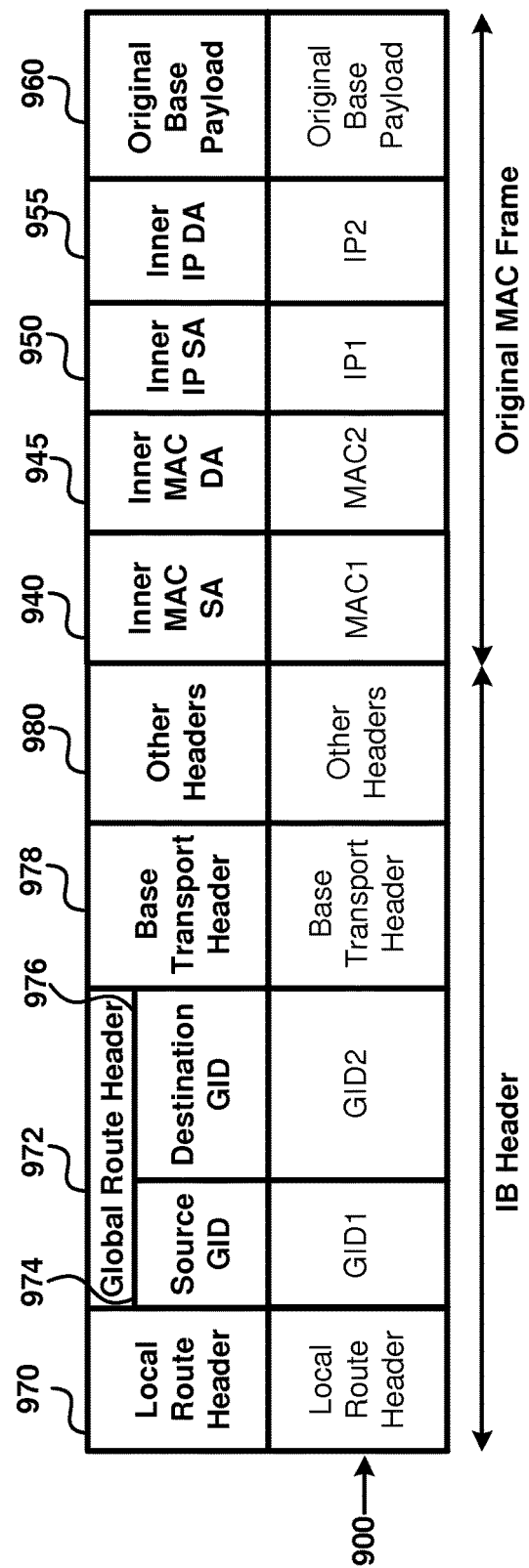
FIG. 9A illustrates the manner in which a MAC frame is encapsulated by an IB header to form an IB packet, in an embodiment of the present disclosure.
Figure 9B:
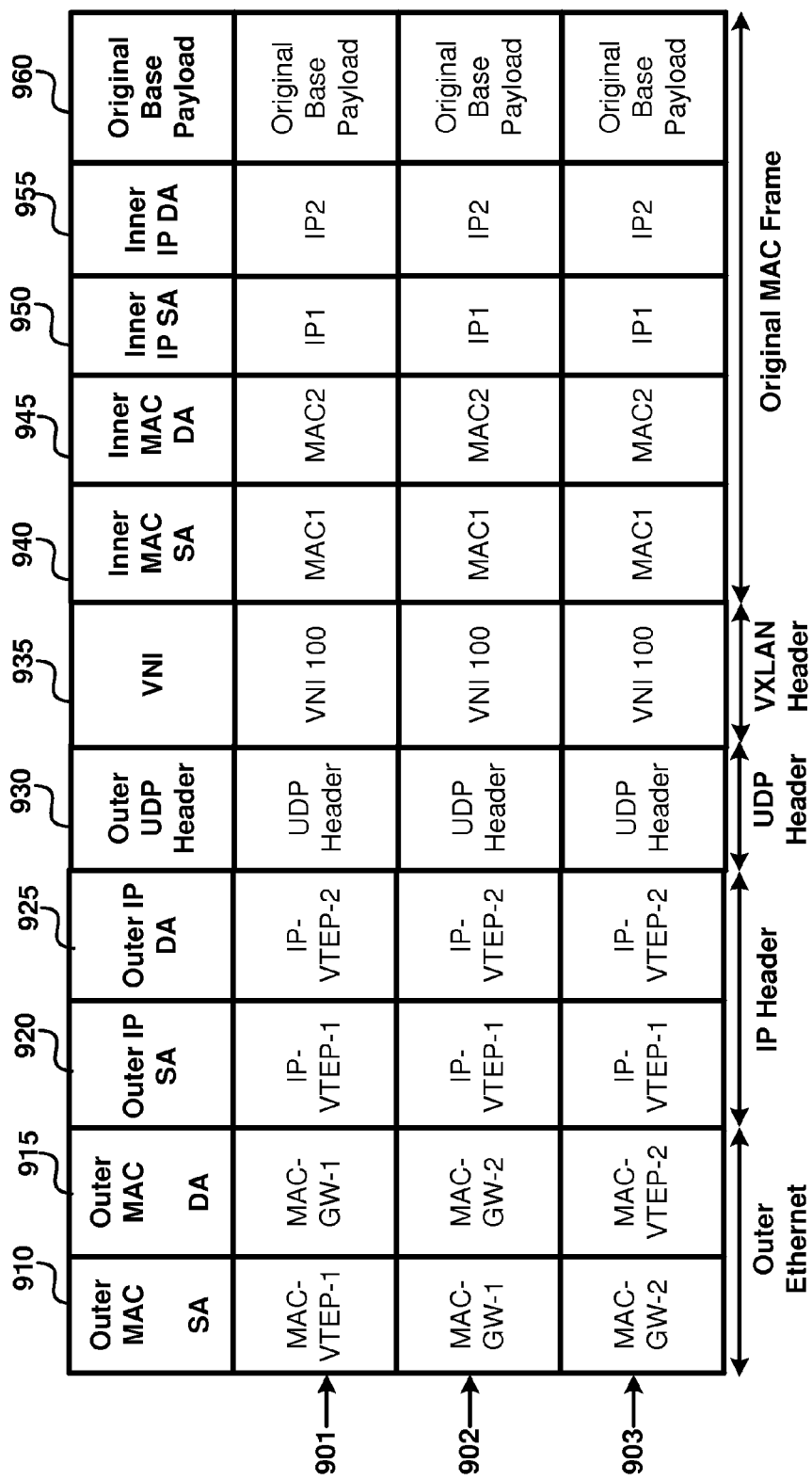
FIG. 9B illustrates the manner in which packets directed to migrated VM are transported from the switched fabric system initially hosting the VM, to the external system hosting the migrated VM, in an embodiment of the present disclosure.
Figure 9C:
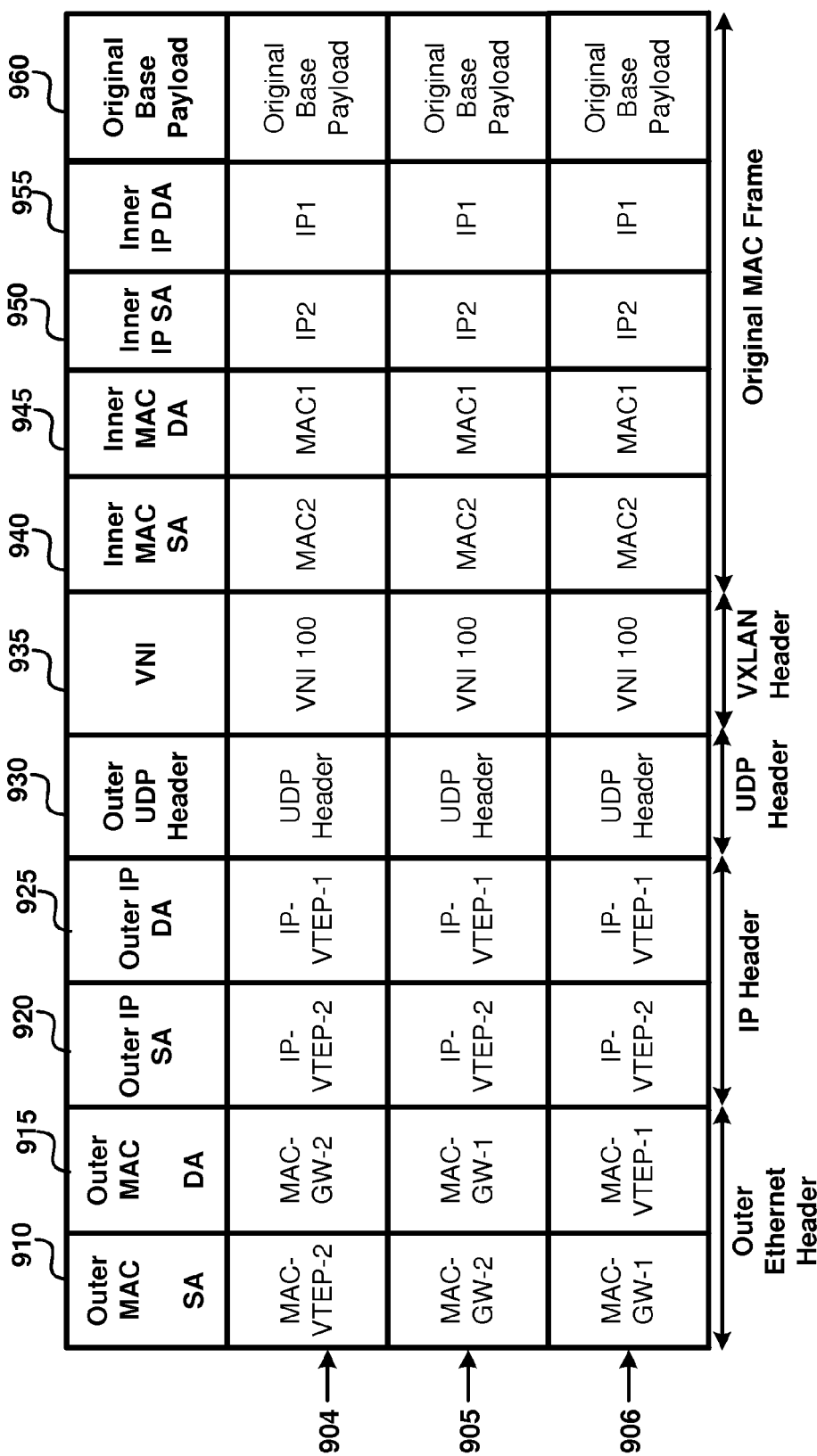
FIG. 9C illustrates the manner in which packets originating from migrated VM are transported to the switched fabric system initially hosting the VM, in an embodiment of the present disclosure.

FIG. 9A shows the MAC frame being encapsulated in an IB frame in an exemplary data transfer from VM GID1 to VM GID2. FIG. 9B shows the MAC frame as part of a VXLAN encapsulated Ethernet packet (after the IB header is removed), and the three hops involved in transporting the VXLAN packet from bridge 107 to bridge 137. FIG. 9C shows the reverse path of the VXLAN encapsulated Ethernet packet, as the packet travels from bridge 137 to bridge 107.

FIG. 9A illustrates the packet format of an IB packet transported from switched fabric 106 to bridge 107 in appliance 110, in one embodiment. Only some of the fields of the packet, as relevant to an understanding of the transporting of packet, are depicted in the Figure, for conciseness. The remaining fields will be apparent based on the applicable standards, etc., some of which are noted above.

The IB packet in FIG. 9A shows an IB header and the original MAC frame. The IB header contains a global route header 972 containing the source GID 974 and the destination GID 976. Additionally, local route header 970, base transport header 978, and other headers 980 all form part of the IB header.

As relevant to understanding of the operation of the embodiments described above, global route header 972 contains the GIDs (source GID 974 and destination GID 976) of the source VM and the destination VM. For further details as well as description of remaining fields (including other headers 980), the reader is referred to the document entitled, "Infiniband Architecture Specification, Volume 1", available from InfiniBand Trade Association Administration, 3855 SW 153rd Drive, Beaverton, Oreg. 97006 (Ph. No.: 503.619.0565), noted above. As may be readily appreciated, bridge 107 operates to strip off IB (fabric) header containing fields 970, 972, 978 and 980, and transmits original MAC frame containing fields 940, 945, 950, 955 and 960 further encapsulated by VXLAN header in the example embodiments described above.

FIGS. 9B and 9C illustrate the packet format of a VXLAN encapsulated Ethernet packet transported from one computing system to another computing system, in one embodiment. Only some of the fields of the packets, as relevant to an understanding of the transporting of packets, are depicted in the Figures, for conciseness.

The VXLAN encapsulated Ethernet packets in FIGS. 9B and 9C show an outer Ethernet header containing the MAC address of the source VTEP (field 910) and its next IP destination (field 915), an IP header containing the source IP address of the source VTEP (field 920) and the destination IP address of the destination VTEP (field 925), a UDP header (field 930), a VXLAN header containing a VXLAN Network Identifier (VNI) (field 935), and the original MAC frame that is sent from a local VM destined to a remote VM containing the MAC address of the source VM (field 940), the MAC address of the destination VM (field 945), the IP address of the source VM (field 950), the IP address of the destination VM (field 955), and the original base payload (field 960).

As the VXLAN encapsulated Ethernet packet moves from a source VTEP to a next IP destination ("hop"), the outer Ethernet header changes to reflect the MAC addresses of the source and the next IP destination of the packet. All other values in the packet remain unchanged throughout the transport from one computing system to another computing system.

FIG. 9B shows the packet structure and content of a VXLAN encapsulated Ethernet packet as it is transported from appliance 110 to appliance 130, subsequent to a MAC frame being sent from a local VM GID1 (in appliance 110) destined to a migrated VM GID2A (in appliance 130). The values associated with fields 910-960 in the VXLAN encapsulated Ethernet packet during the packet's three hops from the appliance 110 to appliance 130 are shown by corresponding field values 901-903.

Field values 901 shows the values in the VXLAN encapsulated Ethernet packet during the packet's hop from bridge 107 (source VTEP) to gateway 150 (next IP destination). Accordingly, the outer Ethernet header shows the source MAC address as MAC-VTEP-1 (corresponding to the MAC address of bridge 107) and the destination MAC address as MAC-GW-1 (corresponding to the MAC address of gateway 150).

Field values 902 shows the values in the VXLAN encapsulated Ethernet packet during the packet's hop from gateway 150 (source VTEP) to gateway 160 (next IP destination). Accordingly, the outer Ethernet header shows the source MAC address as MAC-GW-1 (corresponding to the MAC address of gateway 150) and the destination MAC address as MAC-GW-2 (corresponding to the MAC address of gateway 160).

Field values 903 shows the values in the VXLAN encapsulated Ethernet packet during the packet's hop from gateway 160 (source VTEP) to bridge 137 (next IP destination). Accordingly, the outer Ethernet header shows the source MAC address as MAC-GW-2 (corresponding to the MAC address of gateway 160) and the destination MAC address as MAC-VTEP-2 (corresponding to the MAC address of bridge 137).

Referring further to the field values, the IP address of the source VTEP (field 920) will be readily available to bridge 107 at the time of packet formation since bridge 107 is the source VTEP. The IP address of the destination VTEP (field 925) and the VNI (field 935) is obtained from the VTEP table 350 shown FIG. 7B based on the GID of destination VM.

FIG. 9C shows the packet structure of a VXLAN encapsulated Ethernet packet as it is transported from appliance 130 to appliance 110, subsequent to a MAC frame being sent from a migrated VM GID2A (in appliance 130) destined to a local VM GID1 (in appliance 110). The values associated with fields 910-960 in the VXLAN encapsulated Ethernet packet during the packet's three hops from the appliance 130 to appliance 110 are shown by corresponding field values 904-906. As noted earlier, each field in FIG. 9C has the same label/operation as the corresponding field of FIG. 9B, and the description is not repeated for conciseness.

Field values 904 shows the values in the VXLAN encapsulated Ethernet packet during the packet's hop from bridge 137 (source VTEP) to gateway 160 (next IP destination). Accordingly, the outer Ethernet header shows the source MAC address as MAC-VTEP-2 (corresponding to the MAC address of bridge 137) and the destination MAC address as MAC-GW-2 (corresponding to the MAC address of gateway 160).

Field values 905 shows the values in the VXLAN encapsulated Ethernet packet during the packet's hop from gateway 160 (source VTEP) to gateway 150 (next IP destination). Accordingly, the outer Ethernet header shows the source MAC address as MAC-GW-2 (corresponding to the MAC address of gateway 160) and the destination MAC address as MAC-GW-1 (corresponding to the MAC address of gateway 150).

Field values 906 shows the values in the VXLAN encapsulated Ethernet packet during the packet's hop from gateway 150 (source VTEP) to bridge 107 (next IP destination). Accordingly, the outer Ethernet header shows the source MAC address as MAC-GW-1 (corresponding to the MAC address of gateway 150) and the destination MAC address as MAC-VTEP-1 (corresponding to the MAC address of bridge 107).

Once the VXLAN encapsulated Ethernet packets are received at the respective destination bridges (i.e., bridge 137 with respect to FIG. 9B, and bridge 107 with respect to bridge 9C), the VXLAN encapsulated Ethernet packets will be processed as described in the disclosure above (see FIG. 3 and FIG. 5), with the corresponding switched fabric forwarding the original MAC packet to the respective destination VMs.

In FIGS. 9B and 9C, it may be appreciated that each of 901-906 can be viewed as a corresponding packet, with the values in each packet shown against respective fields shown at the top.

It should be appreciated that the features described above can be implemented in various embodiments as a desired combination of one or more of hardware, executable modules, and firmware. The description is continued with respect to an embodiment in which various features are operative when executable modules are executed.

10. Computer Readable Medium

Though not shown, various components of appliance 110 (including bridge 107, nodes 105A-N, and VM management system 190), may be driven by software instructions provided from a non-volatile storage media/medium. The instructions may be retrieved into random access memories (for superior performance) and executed by the processors to provide various features described above, including (one or more of) providing a run-time environment for supporting VMs, the steps of FIG. 2, the implementation of bridge 107, etc.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives. Volatile media includes dynamic memory, such as RAM.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

11. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of supporting virtual machines (VMs) in a first computing system, said method comprising:

hosting a first set of VMs on a first plurality of computing nodes contained in said first computing system, said first plurality of computing nodes being connected by a first switched fabric providing point-to-point connection between any two of said first plurality of computing nodes;

identifying a condition requiring migration of a first VM of said first set of VMs to outside of said first computing system, said first VM being hosted on a first computing node of said first plurality of computing nodes before said migration;

determining an external system suitable for hosting said first VM, said external system capable of being implemented as either a switched fabric based system or a non-switched-fabric based system, said switched fabric based system containing a second plurality of nodes being connected by a second switched fabric providing point-to-point connection between any two of said second plurality of computing nodes, said non-switched fabric based system containing a third plurality of nodes being connected by a non-switched fabric;

migrating said first VM to a second node of said second plurality of nodes in said switched fabric based system, if said external system is implemented as said switched fabric based system;

migrating said first VM to a third node of said third plurality of nodes in said non-switched-fabric based system, if said external system is implemented as said non-switched-fabric based system;

generating MAC (medium access control)packets destined for forwarding to said first VM by a second VM of said first set of VMs, wherein each MAC packet is encapsulated by a fabric header to form a corresponding switched packet;

switching each switched packet based on said fabric header, wherein said switching delivers each switched packet, including a first switched packet, to a bridge provided within said first computing system; and generating an IP packet by stripping off said fabric header from said first switched packet, and adding an IP header, said IP header containing a destination field set to an external IP address, said external IP address being that of said switched fabric based external system, if said external system is implemented as said switched fabric based system, said external IP address being that of said non-switched-fabric based external system, if said external system is implemented as said non-switched-fabric based system; and sending said IP packet on an IP based network, wherein said generating and said sending are performed by said bridge, wherein said bridge is also addressable by an IP address, said IP packet containing said IP address of said bridge in a source IP address field when said IP packet is sent on said IP based network.

2. The method of claim 1, wherein said bridge is in communication with said external system according to VXLAN, said method further comprising:

maintaining a VTEP (virtual tunnel end point) table containing a mapping of a MAC address of said first VM in said first computing system to said external IP address, and also a VNI (virtual network identifier), said VNI representing a segment according to said VXLAN; and generating said IP packet as a VXLAN packet using said VTEP table, wherein said sending sends said VXLAN packet as said IP packet on said IP based network.

3. The method of claim 2, further comprising:

in-migrating a third VM from said external system to said first computing system, wherein said third VM is assigned a local machine identifier (MID) in said first computing system;

maintaining a bridge table containing a mapping of the MAC address of said third VM to said local MID, and to said VNI;

receiving a second packet from a fourth VM in said external system, said second packet containing said MAC address of said third VM and said VNI;

determining said local MID of said third VM, by examining said bridge table; and encapsulating a MAC portion of said second packet with said determined local MID such that said switching operates to forward the resulting encapsulated packet to said third VM.

4. The method of claim 3, wherein switching is based on a forwarding table containing a plurality of entries, with each entry indicating a port at which a VM with a corresponding MID is connected, said method further comprising:

mapping, in said third VM, the MIDs of all VMs in said external system to an MID of said bridge, wherein said forwarding table contains an entry mapping the MID of said bridge to a port on which the bridge is directly connected in said first computing system;

sending, from said third VM, a third MAC frame to a fourth VM hosted in said external system, said third MAC frame being encapsulated by a fabric header containing said MID of said bridge indicating that said bridge is the destination of said third MAC frame, wherein said bridge, upon receiving said third MAC frame, forwards said third MAC frame to said fourth VM on said external system based on information contained in said bridge table and said VTEP table.

5. The method of claim 1, wherein each of said first switched fabric and said second switched fabric provides a corresponding switched physical connection path between respective ports of the switched fabric coupling to each of the corresponding two computing nodes to provide the point-to-point connection between the two computing nodes.

6. The method of claim 5, wherein said non-switched fabric is based on broadcast medium providing connection between any two nodes of said third plurality of nodes.

7. The method of claim 6, wherein both of said first switched fabric and said second switched fabric are in accordance with InfiniBand (IB) technology, and said broadcast medium is according to Ethernet technology.

8. A non-transitory machine readable medium storing one or more sequences of instructions for enabling a first computing system to support virtual machines (VMs), wherein execution of said one or more instructions by one or more processors contained in said first computing system enables said first computing system to perform the actions of:

hosting a first set of VMs on a first plurality of computing nodes contained in said first computing system, said first plurality of computing nodes being connected by a first switched fabric providing point-to-point connection between any two of said first plurality of computing nodes;

identifying a condition requiring migration of a first VM of said first set of VMs to outside of said first computing system, said first VM being hosted on a first computing node of said first plurality of computing nodes before said migration;

determining an external system suitable for hosting said first VM, said external system capable of being implemented as either a switched fabric based system or a non-switched-fabric based system, said switched fabric based system containing a second plurality of nodes being connected by a second switched fabric providing point-to-point connection between any two of said second plurality of computing nodes, said non-switched fabric based system containing a third plurality of nodes being connected by a non-switched fabric;

migrating said first VM to a second node of said second plurality of nodes in said switched fabric based system, if said external system is implemented as said switched fabric based system;

migrating said first VM to a third node of said third plurality of nodes in said non-switched-fabric based system, if said external system is implemented as said non-switched-fabric based system;

generating MAC packets destined for forwarding to said first VM by a second VM of said first set of VMs, wherein each MAC packet is encapsulated by a fabric header to form a corresponding switched packet;

switching each switched packet based on said fabric header, wherein said switching delivers each switched packet, including a first switched packet, to a bridge provided within said first computing system; and generating an IP packet by stripping off said fabric header from said first switched packet, and adding an IP header, said IP header containing a destination field set to an external IP address, aid external IP address being that of said switched fabric based external system, if said external system is implemented as said switched fabric based system, said external IP address being that of said non-switched-fabric based external system, if said external system is implemented as said non-switched-fabric based system; and sending said IP packet on an IP based network, wherein said generating and said sending are performed by said bridge, wherein said bridge is also addressable by an IP address, said IP packet containing said IP address of said bridge in a source IP address field when said IP packet is sent on said IP based network.

9. The non-transitory machine readable medium of claim 8, wherein said bridge is in communication with said external system according to VXLAN, said actions further comprising:

maintaining a VTEP (virtual tunnel end point) table containing a mapping of a MAC address of said first VM in said first computing system to said external IP address, and also a VNI (virtual network identifier), said VNI representing a segment according to said VXLAN; and generating said IP packet as a VXLAN packet using said VTEP table, wherein said sending sends said VXLAN packet as said IP packet on said IP based network.

10. The non-transitory machine readable medium of claim 9, further comprising:

in-migrating a third VM from said external system to said first computing system, wherein said third VM is assigned a local machine identifier (MID) in said first computing system;

maintaining a bridge table containing a mapping of the MAC address of said third VM to said local MID, and to said VNI;

receiving a second packet from a fourth VM in said external system, said second packet containing said MAC address of said third VM and said VNI;

determining said local MID of said third VM, by examining said bridge table; and encapsulating a MAC portion of said second packet with said determined local MID such that said switching operates to forward the resulting encapsulated packet to said third VM.

* * * * *

UNITED STATES PATENT AND TRADEMARK OFFICE
CERTIFICATE OF CORRECTION

| | | |
|---|---|---|
| PATENT NO. | : 9,733,968 B2 | Page 1 of 1 |
| APPLICATION NO. | : 14/658315 | |
| DATED | : August 15, 2017 | |
| INVENTOR(S) | : Narasimhamurthy et al. | |

It is certified that error appears in the above-identified patent and that said Letters Patent is hereby corrected as shown below:

On the Title Page

On page 2, Column 1, under Other Publications, Line 8, before "tomsitpro.com/" insert -- http://www. --.

On page 2, Column 1, under Other Publications, Line 13, before "definethecloud.net/" insert -- http://www. --.

In the Specification

In Column 1, Line 26, delete "etc" and insert -- etc. --, therefor.

In Column 12, Line 7, delete "GID 2" and insert -- GID2 --, therefor.

In Column 12, Line 14, delete "GID 2," and insert -- GID2, --, therefor.

In Column 12, Line 15, delete "GID 2." and insert -- GID2. --, therefor.

In Column 12, Line 46, delete "GID 2" and insert -- GID2 --, therefor.

In Column 12, Line 51, delete "GID 2." and insert -- GID2. --, therefor.

In Column 17, Line 33, delete "manger" and insert -- manager --, therefor.

In Column 17, Line 61, delete "VxLAN" and insert -- VXLAN --, therefor.

In the Claims

In Column 23, Line 3, in Claim 1, delete "control)packets" and insert -- control) packets --, therefor.

Signed and Sealed this
Twenty-ninth Day of May, 2018

Andrei Iancu
*Director of the United States Patent and Trademark Office*